United States Patent [19]

Foster

[11] 4,171,824
[45] Oct. 23, 1979

[54] BICYLE

[76] Inventor: Edwin E. Foster, 1801 Camp Craft Rd., Austin, Tex. 78746

[21] Appl. No.: 799,566

[22] Filed: May 23, 1977

[51] Int. Cl.² ............................................. B62H 1/08
[52] U.S. Cl. .................................. 280/294; 74/594.6
[58] Field of Search ........................... 280/294, 281 R; 74/594.4, 594.5, 594.6, 594.7, 594.1, 594.2

[56] References Cited

U.S. PATENT DOCUMENTS

| | | | |
|---|---|---|---|
| 292,545 | 1/1884 | Davis | 74/594.6 X |
| 586,629 | 7/1897 | Simonis | 280/294 |
| 616,489 | 12/1898 | Ramsey | 74/594.5 |
| 640,380 | 1/1900 | Hart | 280/294 |
| 654,452 | 7/1900 | Haven | 280/294 |
| 1,921,029 | 8/1933 | Hess | 280/293 |
| 2,855,219 | 10/1958 | Douglas | 280/281 R |
| 3,448,997 | 6/1969 | Kosugi | 280/281 R |
| 3,857,587 | 12/1974 | Foster | 280/294 |
| 3,877,726 | 4/1975 | Foster | 280/294 |

FOREIGN PATENT DOCUMENTS

| | | | |
|---|---|---|---|
| 1252601 | 12/1960 | France | 74/594.4 |
| 314830 | 6/1956 | Switzerland | 74/594.4 |

*Primary Examiner*—Joseph F. Peters, Jr.
*Assistant Examiner*—Michael Mar
*Attorney, Agent, or Firm*—Kalish & Gilster

[57] ABSTRACT

A bicycle incorporating a frame with unitary components interconnecting the post with the rear wheel axle permitting of facile mounting and dismounting by a member of either sex with a vertically movable seat obviating the rider's withdrawal therefrom during bicycle stoppage; and with the bicycle being equipped with underslung pedals which may, if elected, be formed with a support stand either of nonmovable character or of toggle design for movement between retracted, inoperative and extended, operative positions by the user's foot. The bicycle also embodies a pedal actuated brake assembly designed for locking disposition upon back-pedaling and release through operation of a conveniently presented control cable; there also being a mounting for the handlebar permitting of rapid disposition of the handlebars in selected attitude without resort to extrinsic tools. Furthermore, the pedals may be provided with foot-engaging elements for safely retaining the rider's foot upon the pedal for permitting uninhibited withdrawl in the event of any contingency.

38 Claims, 48 Drawing Figures

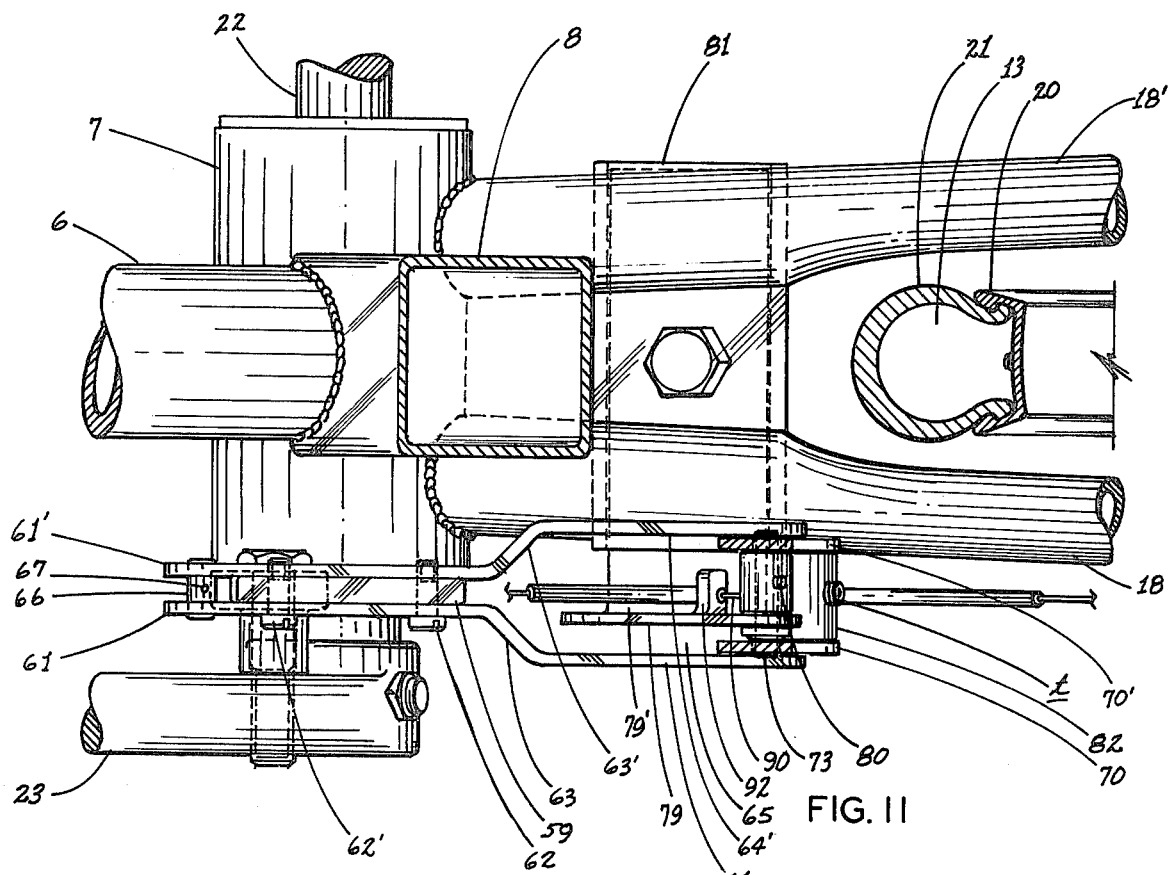
FIG. 11
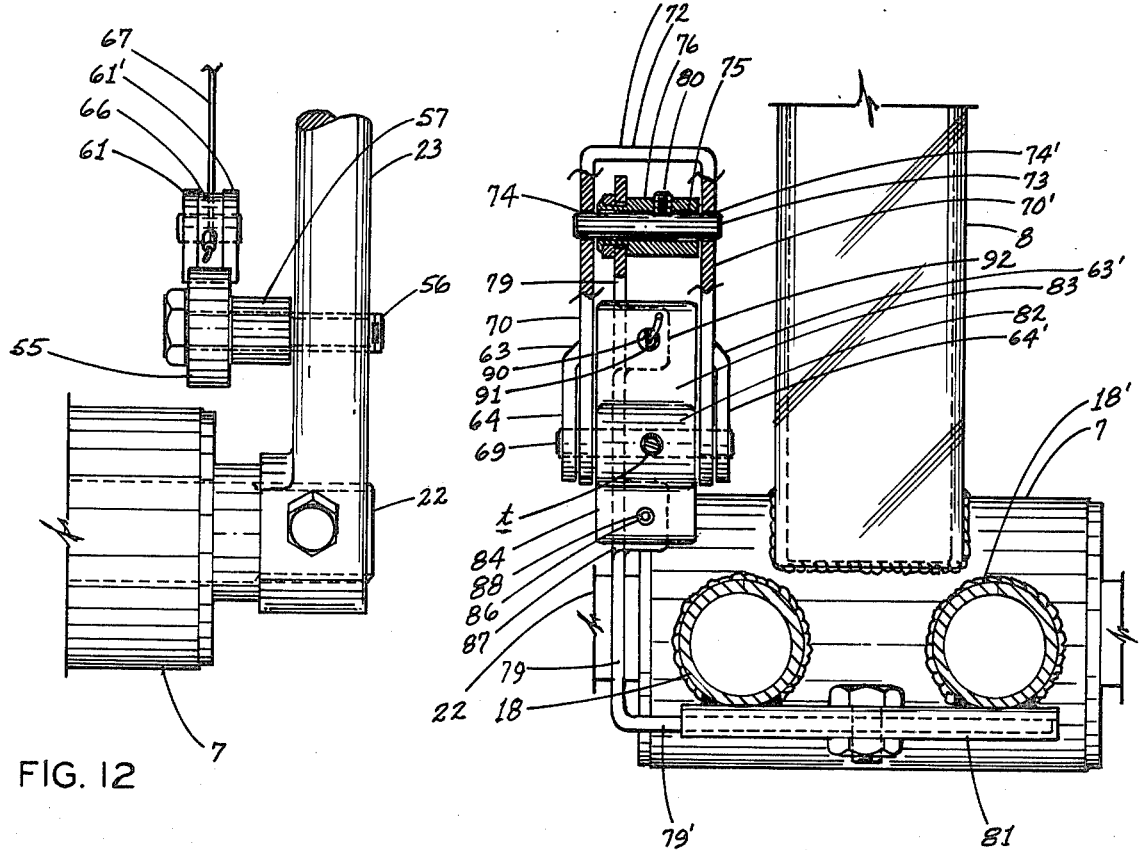
FIG. 12
FIG. 13

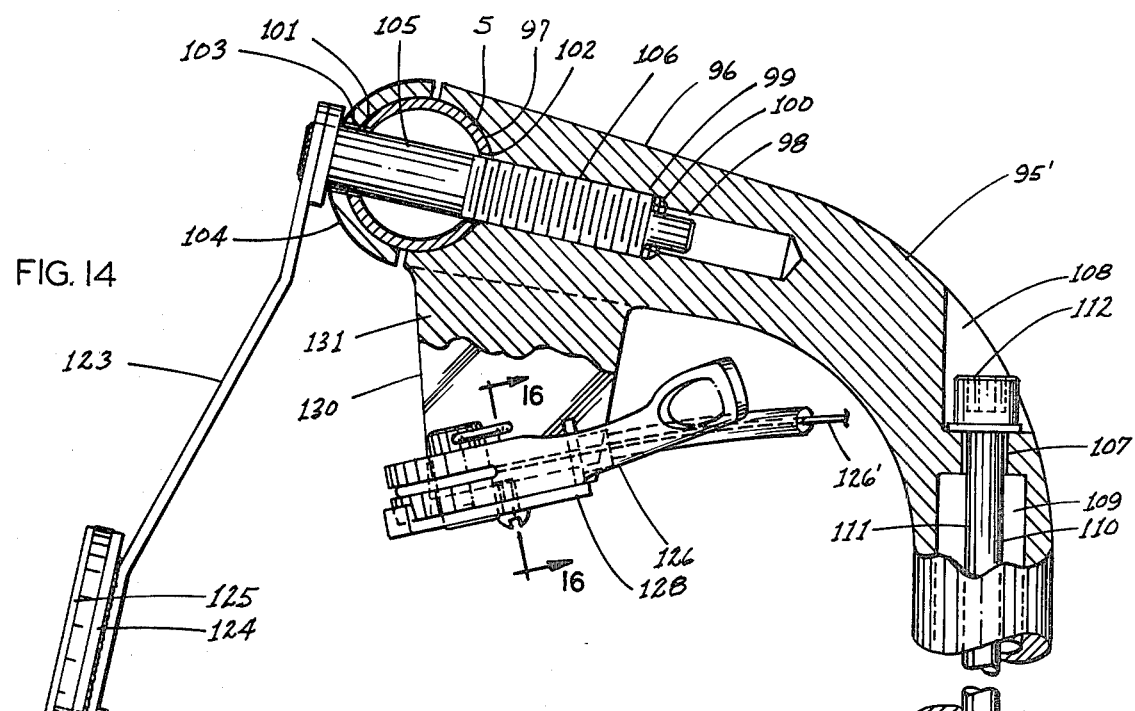
FIG. 14
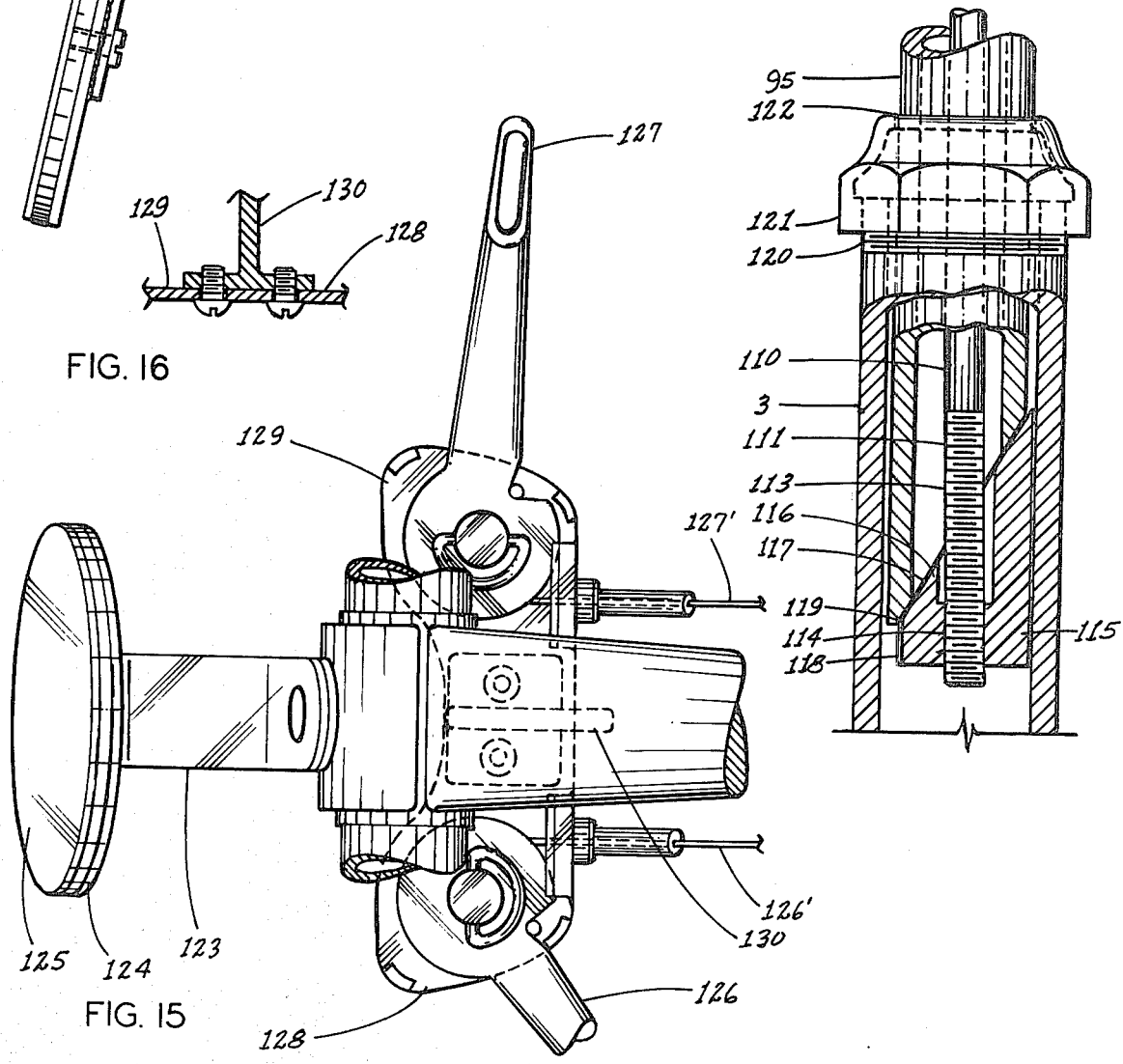
FIG. 16
FIG. 15

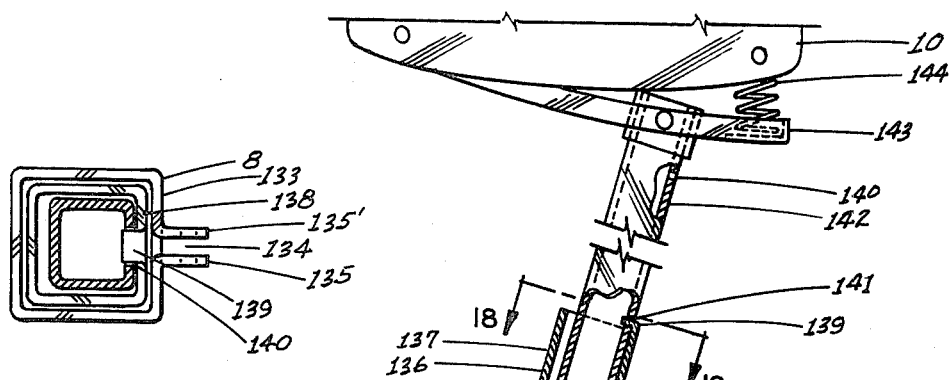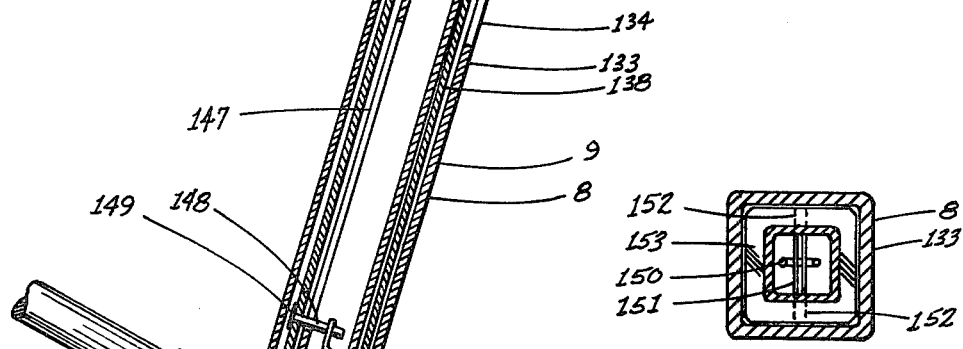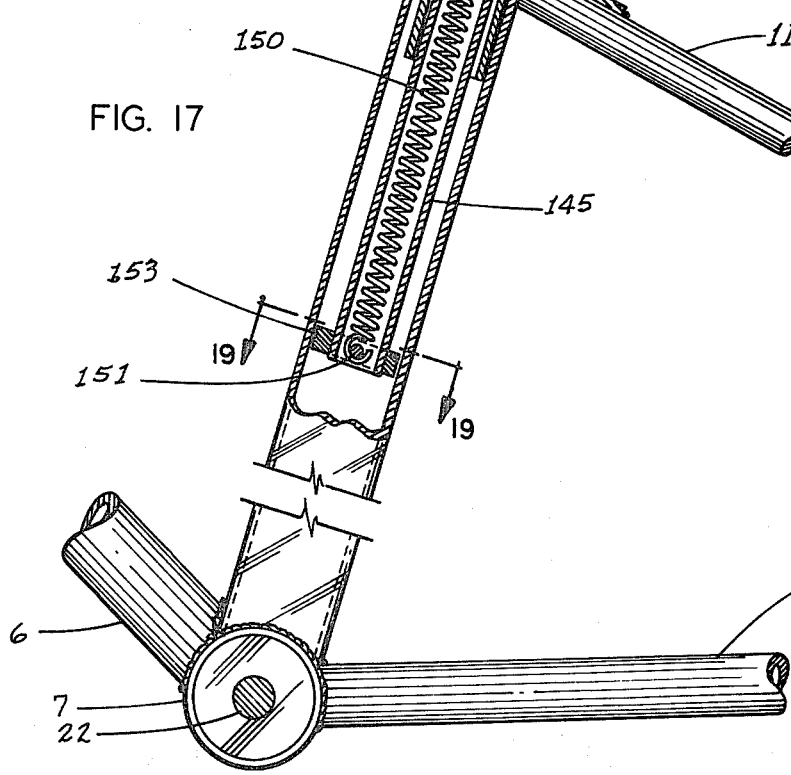

BICYLE

BACKGROUND AND SUMMARY OF THE INVENTION

This invention relates in general to bicycles and, more particularly, to a bicycle incorporating various new and useful improvements adapted to enhance the safety in operation thereof, as well as the economic, sturdy construction of the same.

Although the bicycle is a long and well known expedient for mobility, the basic style of the same has scarcely changed through the years, nor have there been any fundamental modifications in the components thereof other than primarily the introduction of hand-operated, rather than foot-operated brakes, and the provision of gearing for altering the ratio of revolution between the driving sprocket and the rear wheel. However, through the years various drawbacks or inadequacies in bicycle construction have been observed but without any appreciable effort to overcome same. One example has been the customary provision of different styles of bicycles for males and females, with the one for the former having a horizontal bar connecting the front post and the rear seat support stem, and the one for the latter being devoid of such bar to permit a stepping through for mounting and dismounting. Such provision of two types of styles has, of course, been recognizedly costly for manufacturing concerns, as well as being limiting upon, or inhibiting the freedom of individuals to use the type designed for the opposite sex.

Another inadequacy has been the provision of a seat which remains fixedly in selected elevated disposition and which thus presents a potentially damaging weapon to the back of the user when the latter is in a standing position with respect to the bicycle, such as at a stoplight or the like, so that should there be any untoward force crashing into the rear of the bicycle in such condition, the seat would serve as a ram to strike the rider's lower back with potential injury.

Another area in which current bicycles provide a hazard is in the provision of a normally vertical post upon which the handlebars are mounted, which post presents a severe hazard in the event the rider is thrown forwardly by accident with potential striking of the upper end of such post.

Although hand-operated brakes are widely used, the same do present a consistent danger in that riders all too frequently apply same in a most rapid fashion causing a near instantaneous stoppage of the bicycle with the rider being catapulted, as it were, forwardly. Therefore, the desire to return to foot control for caliper type brakes has been long recognized.

In addition, current bicycles have consistently presented the foot pedals upon an axis of rotation coincident with that of the crank arm of the pedal crank so that such pedals are reasonably elevated above the support surface whereby in case of an emergency a rider is occasioned difficulty in quickly reaching the support surface or ground for requisite evasive or emergency action. Additionally, the use of toe clips has become quite commonplace with bicycle pedals for assuring the nonremoval of the rider's feet during relatively high speed travel. Such toe clips do present a serious danger in that they inhibit the facile removal of the rider's feet from the pedal at a critical juncture.

Another aspect of bicycles which has been given improper attention heretofore relates to a means for quickly and easily altering the disposition of the handlebars as between selected attitudes, such as between touring and racing conditions. Customarily, tools, such as wrenches, must be resorted to for altering the position of the handlebars with attendant difficulty and time consumption. Also, in view of the fact that the gear shift levers, as well as brake controls are customarily mounted upon the handlebars, such in numerous instances are not adjustable.

Therefore, by the present invention there is presented a bicycle which unitarily integrates a multiplicity of ingenious components which jointly inter-relate to conduce to a vehicle embodying the improvements long needed. The bicycle of the present invention is adapted for use for either sex as it contains a frame having frame elements downwardly and rearwardly inclined from the front post which, while enhancing the stability of the bicycle permit of easy mounting by individuals of either sex regardless of their wearing apparel. The said bicycle uniquely embodies a seat disposed upon a vertically shiftable rod controllable by the user through body movements so as to effect a lowering upon dismounting so that the seat is not directed at the rider's back should the rider be in stationary, straddling position upon the bicycle in a position of rest; and which seat is returnable to elevated riding position in equally facile fashion.

The present bicycle also incorporates pedal-controlled caliper brakes thereby obviating the need for hand control brakes so that the handlebars are manifestly devoid of such units. Pedal control caliper brakes are generally shown in co-pending application Ser. No. 547,574 filed Feb. 6, 1975, now U.S. Pat. No. 4,030,774. However, in the present invention the brake control assembly incorporates a novel cam-operated push link and associated equalizer lever for effecting braking action in a manner not heretofore taught. The present bicycle also embodies pedals of the under slung type, that is, wherein the foot support is located beneath the axis of rotation of the pedal crank arm so that the rider's foot is substantially nearer the support surface and thus can engage same more quickly and safely than with current bicycles in the event of a contingency. Under slung pedals of this broad type are also disclosed in patent application Ser. No. 547,574 filed Feb. 6, 1975 but in the present instance the pedals are of unique design being adapted for casting or molding and with a greater simplicity in the structure of the constituents but with relatively enhanced strength. Additionally, such pedals incorporate a novel foot-engaging member which obviates the need for the historically accepted toe clip so that the rider's feet may be easily withdrawn laterally or rearwardly from the pedal in a rapid manner and without the potential for interference. Underslung pedals of the type shown in the present application may also carry fixed bicycle supports as of the general type shown in U.S. Pat. No. 3,877,726 but of more reduced character so as to be engageable with the support surface at a single point and with the same being so coordinated that upon application of the brakes the lowermost pedal will be poised for support. Supports of the type just referred to are rigid, being nonfoldable or swingable. It should be pointed out, however, that the pedals of the present invention may be readily balanced so that the same will remain in upright, foot-receiving position at all times.

The present bicycle may also incorporate a pedal having a support stand which is adapted to be moved into supporting position through operation by the user's foot whereby such stand during bicycle travel will be disposed in withdrawal or retracted position. The prior art has revealed certain bicycle stands which are swingable engaged to a foot pedal, such as in the U.S. Pat. Nos. 544,223 and 644,074, to Hart, as well as British Pat. No. 27 794 (1912) and Danish Pat. No. 52305. However, with the present invention the support stand is toggle operated through control of a over-center spring so that the same moves easily into and from support position by mere limited action of the rider's foot and which support stand is adapted to engage the support surface through a reasonable area of contact to provide steadiness regardless of the character of the support surface.

The present invention also additionally embodies novel means for mounting the handlebars so that the same may be shifted from one position to another by mere operation of a torque arm provided on the bicycle, with such conversion being thus effected in minimum time, as within the order of 10 seconds, and without necessity of extrinsic tools.

From the foregoing, and from the following description, it will be evident that the present invention comprises a fully integrated bicycle providing maximum safety for the rider under all conditions, whether in operation or otherwise, so that the inherently injurious components of bicycles heretofore known need no longer be tolerated and such bicycles as well conduce to economy in production and longevity in usage.

Therefore, in view of the foregoing, it is an object of the present invention to provide a bicycle which is adapted for facile, comfortable use by members of either sex and which incorporates components conducing to the safety of the rider.

It is another object of the present invention to provide a bicycle of the character stated which incorporates a novel pedal actuated assembly for controlling front and rear wheel caliper brakes which assembly is automatically operated upon backpedalling and produces a reliable locking of both wheels for appropriate braking action during travel as well as for reliable braked condition for parking.

It is a still further object of the present invention to provide a bicycle of the character stated which incorporates a pedal carried support stand adapted to be automatically disposed for support surface engagement upon actuation of the braking assembly.

It is another object of the present invention to provide a bicycle of the character stated wherein the support stand permits stable disposition of the bicycle upon any selected support surface and whether the same be inclined or otherwise.

It is an additional object of the present invention to provide a bicycle of the character stated equipped with underslung pedals, that is, pedals having a relatively low center of gravity so as to minimize the distance between the pedal and the support surface to allow for rapid and sure contact of the other by the operator's foot in the event of an emergency requiring the removal of the rider's foot from the pedal.

It is a still further object of the present invention to provide a bicycle having underslung pedals which dispose the rider's foot within the order of 1¼" nearer the support surface than accorded by present pedals.

It is a further object of the present invention to provide a bicycle of the character stated having underslung pedals which may be most economically produced; which provide substantial firm engagement with the rider's foot and which may be of relatively light weight.

It is a still further object of the present invention to provide a bicycle of the character stated wherein the underslung pedals may be suitably balanced to assure of the pedals remaining in upright position at all times.

It is an additional object of the present invention to provide a bicycle of the character stated wherein the underslung pedals may be devoid of the customary toe clip but which incorporate a swingably mounted foot retaining element adapted to enhance the engagement of the rider's foot with the pedal but being noninterferring with foot withdrawal.

It is another object of the present invention to provide a bicycle of the character stated incorporating novel means for mounting the handlebars so as to permit selected positioning of the same in a rapid manner and without the use of hand tools.

It is another object of the present invention to provide a bicycle of the character stated which is preferably of the gear type but having gear control members mounted from the stem as contradistinguished on the handlebars so that the latter may be shiftable without requiring compensating adjustment of the gear levers and also whereby said gear levers are located to be removed from the path of any potential injurious impact with the rider's body should the rider be case forwardly upon the bicycle due to a quick stop.

It is yet another object of the present invention to provide a bicycle of the character stated incorporating a vertically shiftably mountable seat permitting the rider to remain on the seat at all times instead of requiring removal, as at a stop light; said seat being designed for movement between locked, upper riding position, and locked lower position with the movement between being controlled by suitable action of the rider's body; thereby obviating the necessity of the rider taking a position in front of the seat during stoppage of the bicycle with the potential for harm to the back or kidneys in the event of the incidence of a forwardly directed force upon the rear of a bicycle when in such condition.

It is a still further object of the present invention to provide a bicycle of the character stated which is stable in construction; which may be most economically produced; which is reliable and safe in usage; and which is designed for longevity by reason of the sturdiness of the components.

It is another object of the present invention to provide a bicycle incorporating a novel frame which is adjustable for various leg lengths and thereby eliminates the need for a multiplicity of individual bicycles of different frame sizes.

DESCRIPTION OF THE DRAWINGS

FIG. 11 is a top plan view, in partial section, of the brake control assembly taken on the line 11—11 of FIG. 10.

FIG. 12 is an end elevational view taken on the line 12—12 of FIG. 10.

FIG. 13 is an end view, in partial section, taken on the line 13—13 of FIG. 10.

FIG. 14 is a vertical transverse sectional view taken on the line 14—14 of FIG. 1.

FIG. 15 is a fragmentary top plan view taken on the line 15—15 of FIG. 1.

FIG. 16 is a vertical transverse sectional view taken on the line 16—16 of FIG. 14.

FIG. 17 is a vertical transverse sectional view taken on the line 17—17 of FIG. 2.

FIG. 18 is a horizontal transverse sectional view taken on the line 18—18 of FIG. 17.

FIG. 19 is a horizontal transverse sectional view taken on the line 19—19 of FIG. 17.

DESCRIPTION OF THE PRACTICAL EMBODIMENTS

Figure 1:
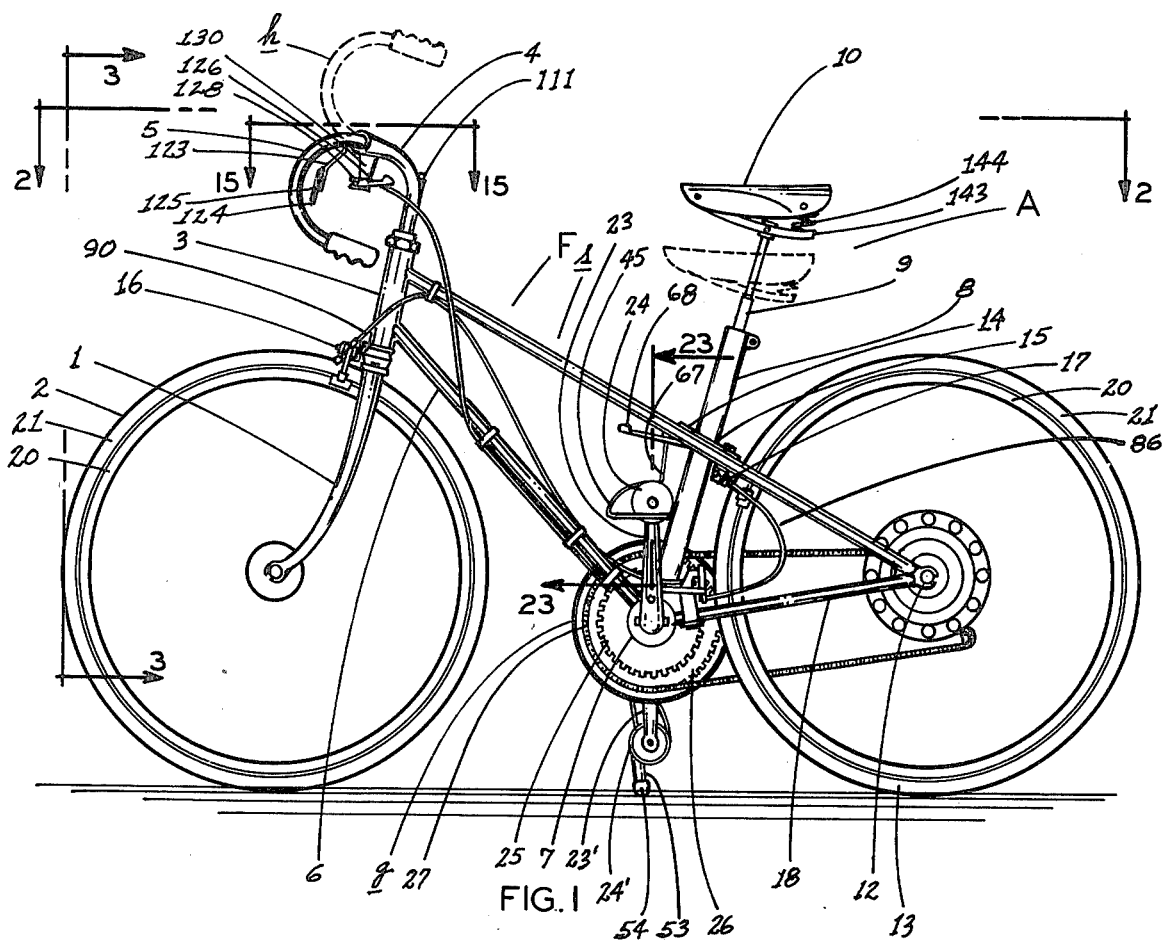
FIG. 1 is a side elevational view of a bicycle constructed in accordance with and embodying the present invention.
Figure 2:
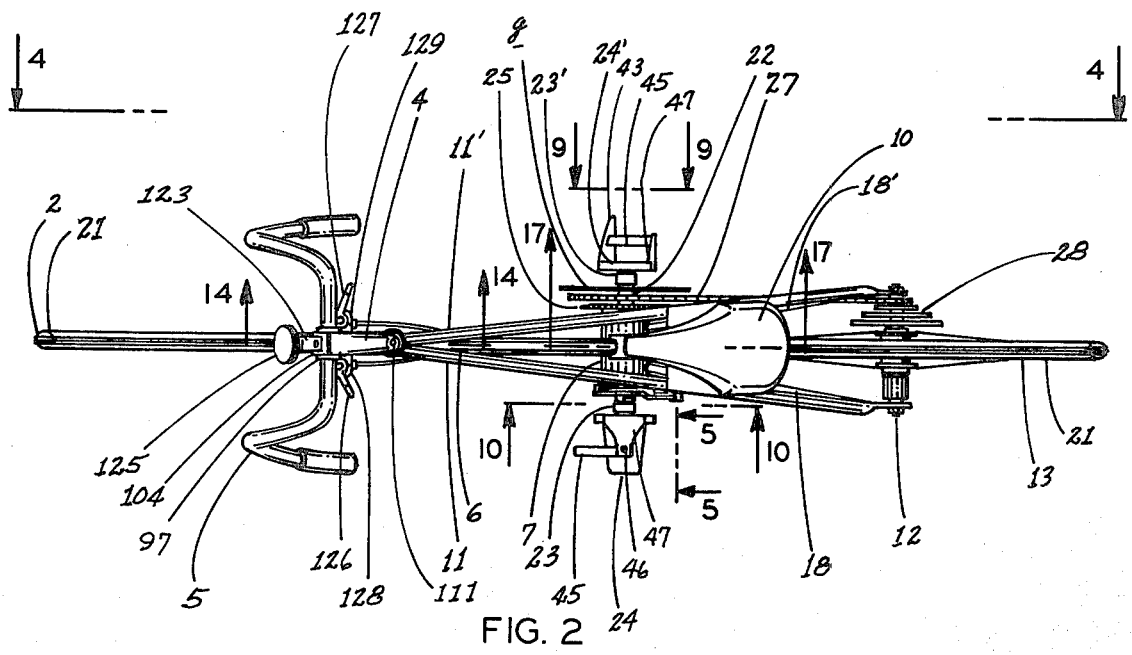
FIG. 2 is a top plan view taken on the line 2—2 of FIG. 1.
Figure 3:
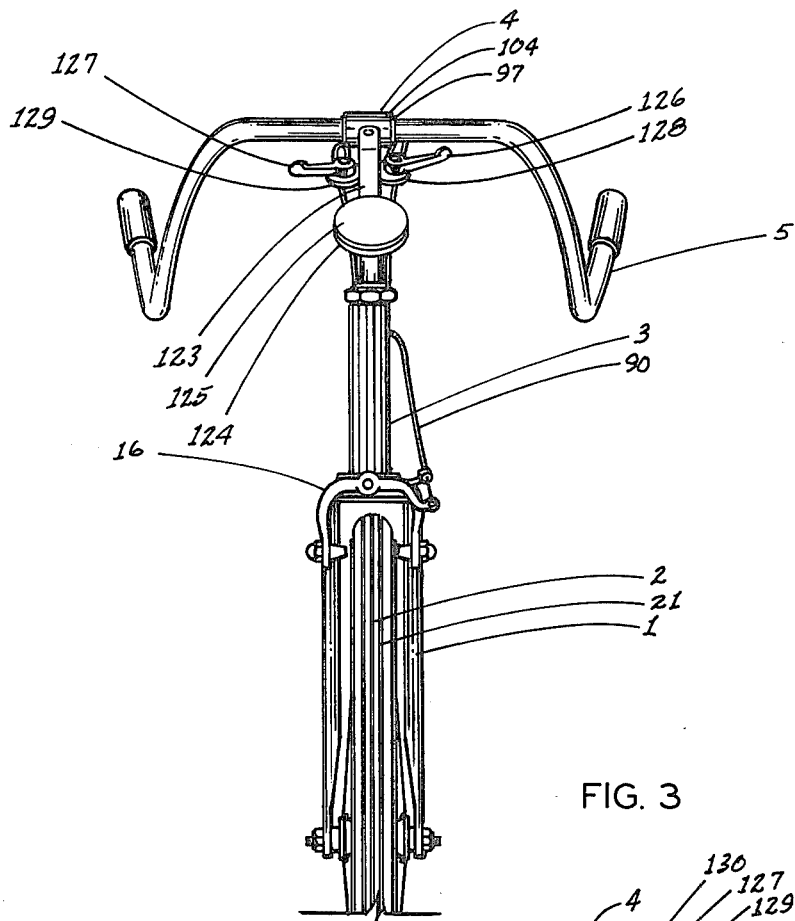
FIG. 3 is a front view taken on the line 3—3 of FIG. 1.
Figure 4:
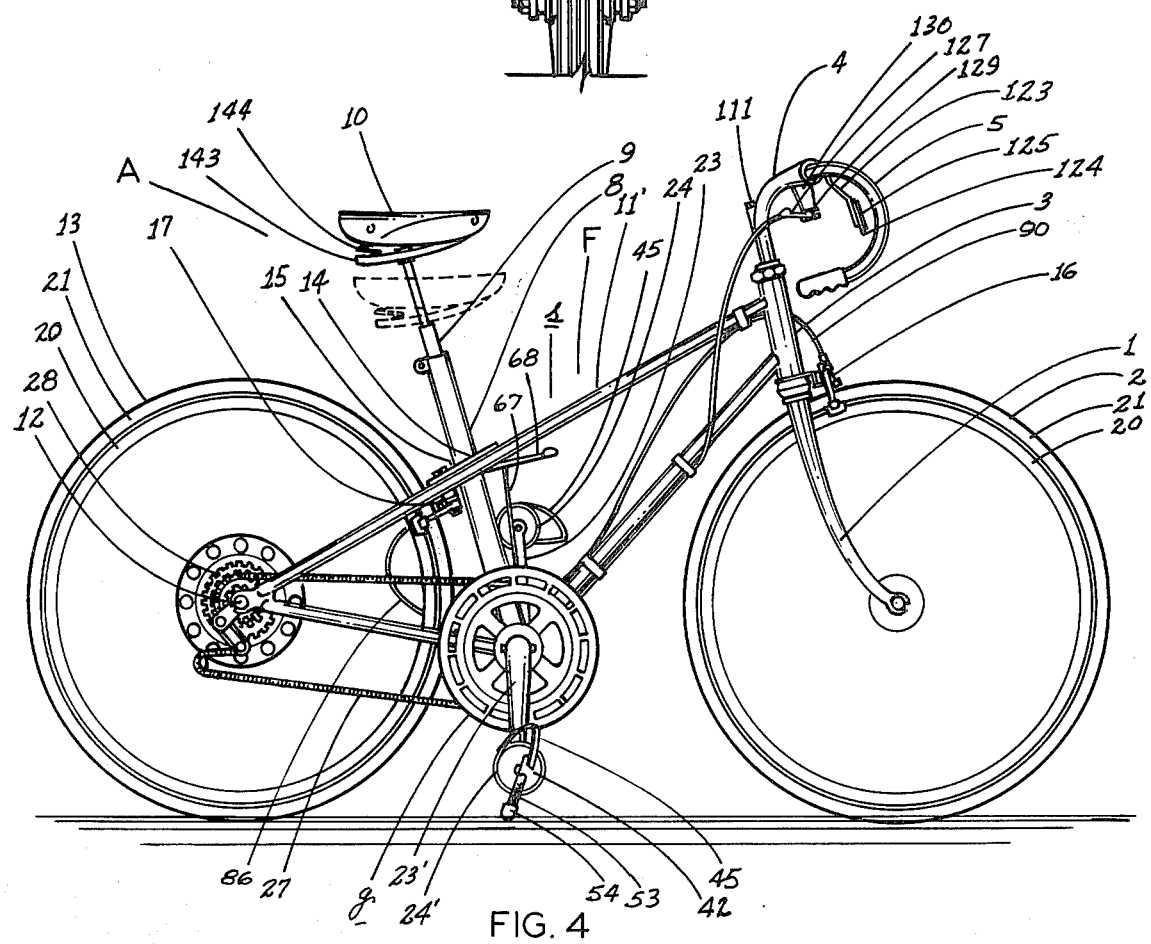
FIG. 4 is a side elevational view taken on the line 4—4 of FIG. 2.
Figure 5:
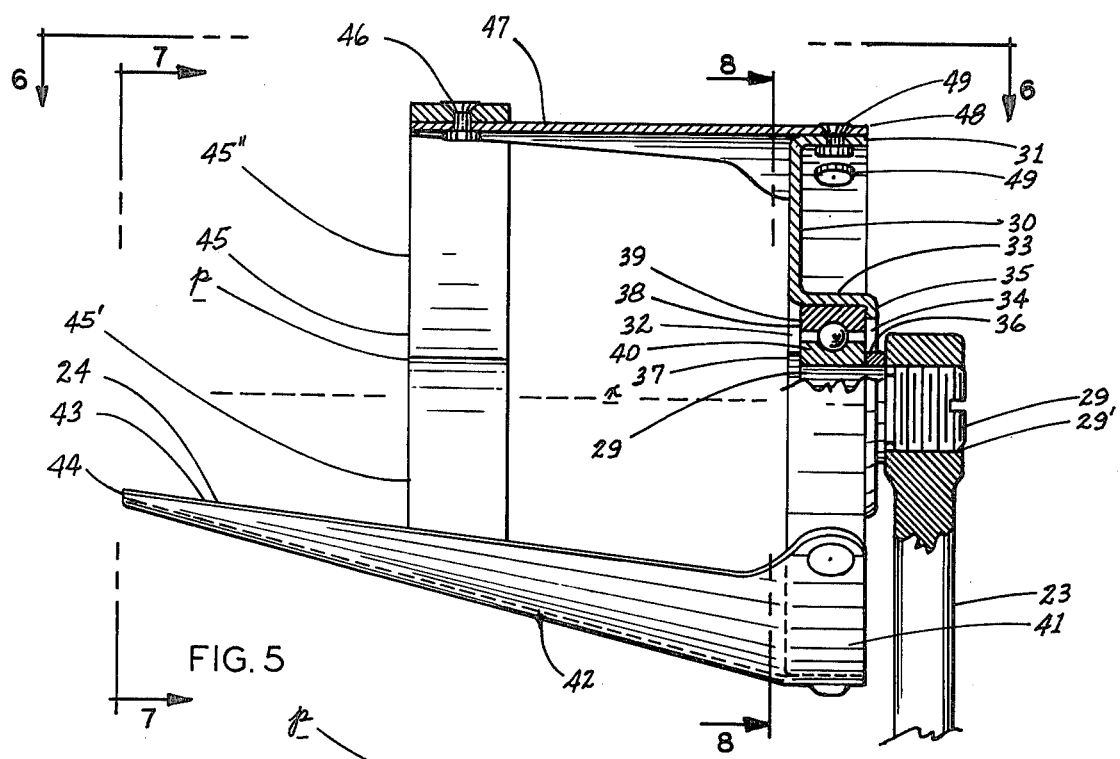
FIG. 5 is an elevational view, in partial section, of the foot pedal taken on the line 5—5 of FIG. 2.
Figure 6:
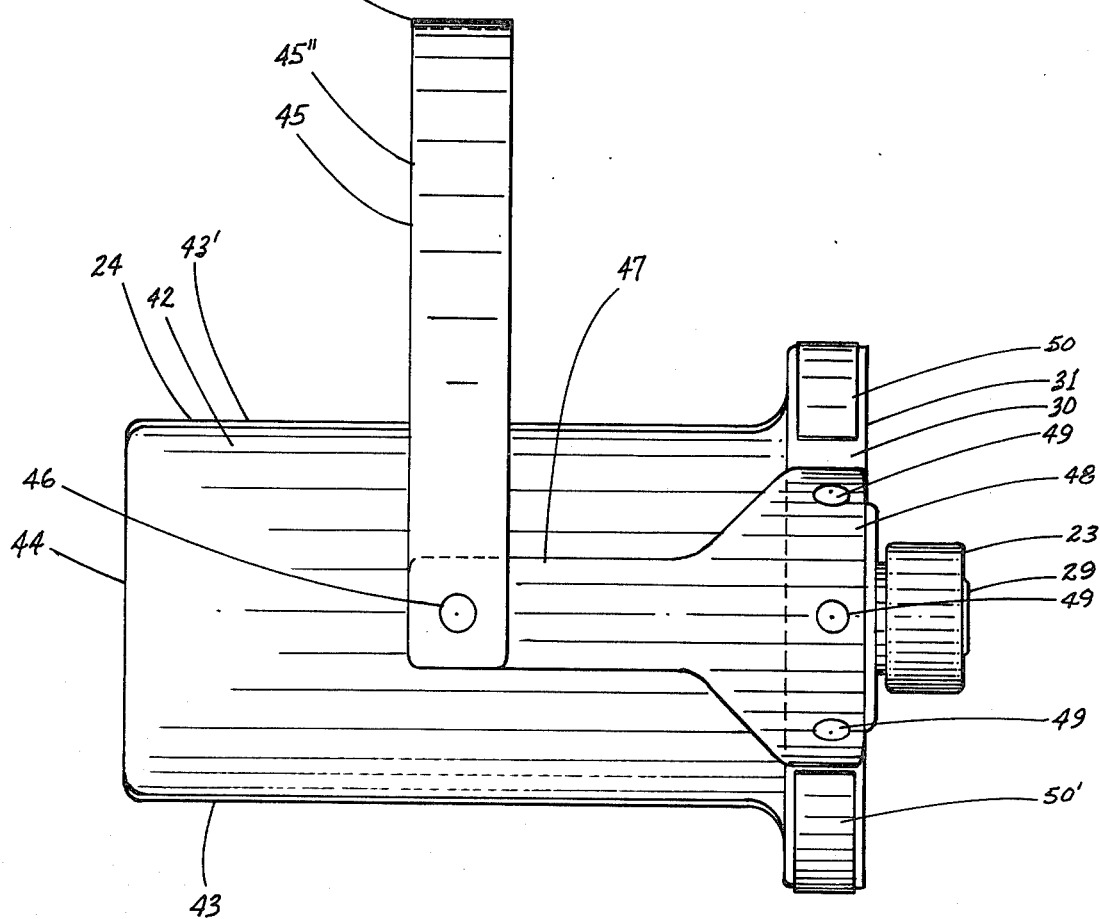
FIG. 6 is a top plan view of the foot pedal taken on the line 6—6 of FIG. 5.
Figure 7:
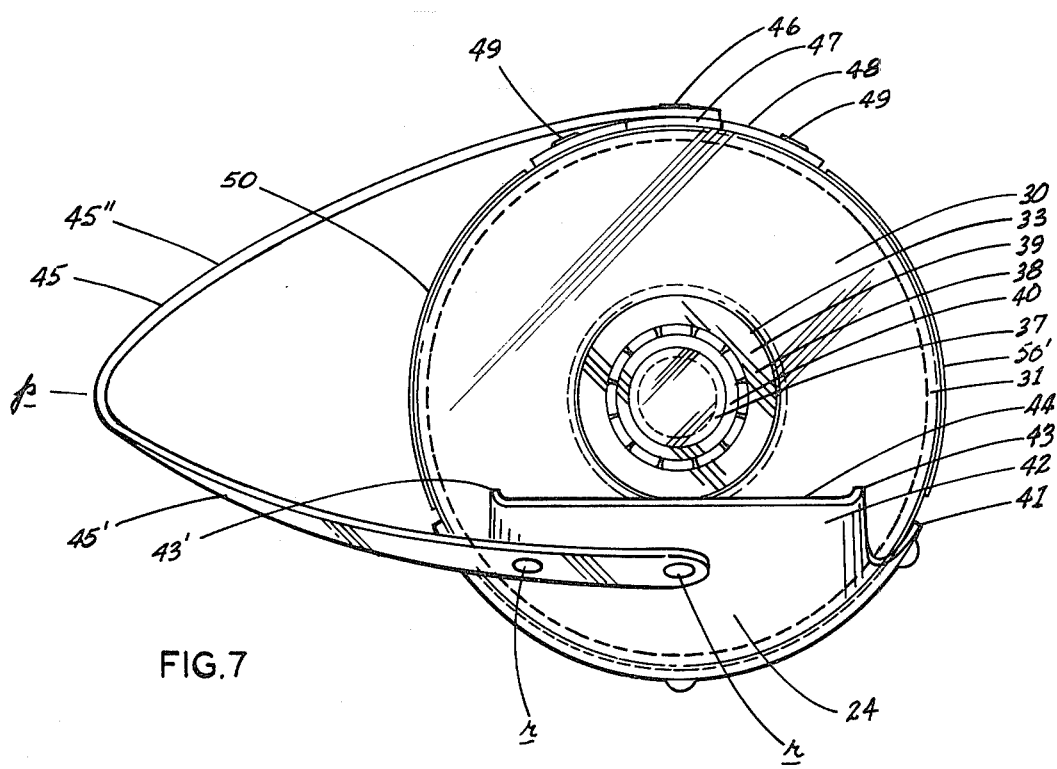
FIG. 7 is a side view of the foot pedal taken on the line 7—7 of FIG. 5.
Figure 8:
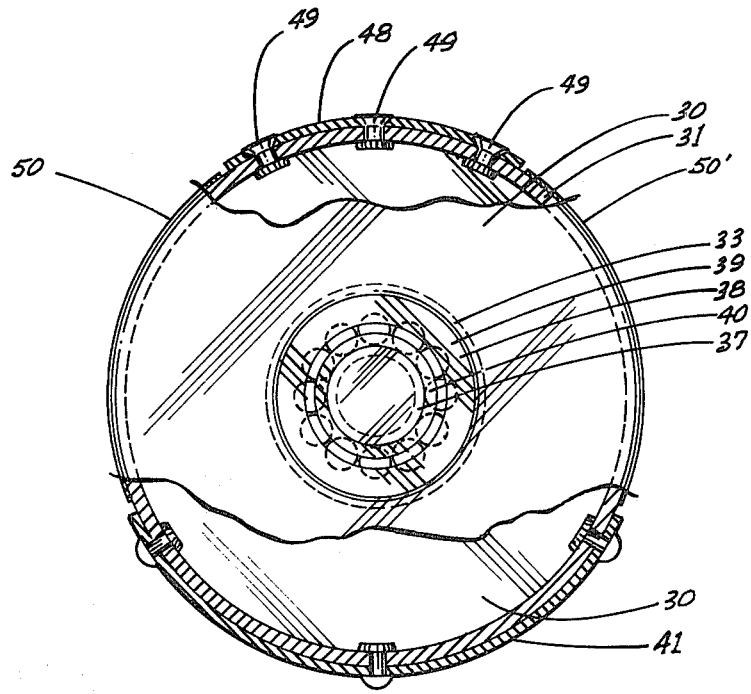
FIG. 8 is a side view, in partial section, of the foot pedal support plate and associated structure taken on the line 8—8 of FIG. 5.

Referring now by reference numerals to the drawings which illustrate practical embodiments of the present invention, A generally designates a bicycle designed for facile use by members of either sex, incorporating a frame F having a front fork 1 mounting a front wheel 2; there being a post 3 extending upwardly from the upper end of fork 1 supporting a stem 4 upon which a handlebar 5 is adjustably mounted. Fixed to the lower rearward end portion of post 3 is the forward, upper end of a rearwardly and donwardly extending bar 6, as of preferably tubular stock, which at its lower, rearward end is rigid with the usual hub 7. Fixed to hub 7 and extending upwardly therefrom, in a slightly rearwardly canted manner is a seat post 8, being of tubular character and open in its upper end for projection therethrough of the upper end portion of a seat adjustment assembly 9 surmounted by a seat 10.

Seat post 8 projects through the spacing s bounded by a pair of frame rods 11, 11' converging at their forward ends for affixation to the upper rearward portion of post 3 and which therefrom incline downwardly and rearwardly in mutually diverging relationship creating the intervening spacing s therebetween, passing on opposite sides of seat post 8, and the rearward extremities of rods 11, 11' are engaged to opposite ends of axle 12 of a rear wheel 13 so that the portions of said rods 11, 11', rearwardly of post 8, in effect, constitute a rear fork for mounting said wheel 13. Seat post 8 is connected to the adjacent portions of rods 11,11' by means of a plate 14 provided with a central opening, as at 15, the marginal edges of which are welded or otherwise fixed to post 8 and with the outer lateral edge portions of plate 14 being similarly secured upon rods 11,11'. By means of said plate 14, seat post 8 is stable and rods 11,11' are firmly mutually integrated for strengthening of frame F.

Front and rear caliper brakes 16,17 are provided upon each wheel 2,13, respectively, and with such brakes being suitably supported from post 3 and plate 14, respectively. Extending rearwardly from hub 7 are the usual rear bars 18,18' for supporting rear wheel axle 12. Each wheel 2,13 may be of the usual spoke type and embody the customary rim 20 for receiving a tire 21. Hub 7 supports a conventional shaft 22 at each end of which there is carried a pedal crank 23,23' at the lower ends of which latter, in a manner to be discussed more fully hereinbelow, there are secured foot pedals 24,24', respectively.

Bicycle A is set forth herein as being of the popular ten-speed type and necessarily is provided with inner and outer drive sprockets 25,26, respectively, secured upon hub shaft 22 between hub 7 and right pedal crank 23'; there being the usual guard plate g. Disposed for selected engagement about drive sprockets 25,26 is the forward portion of the customary endless or transmission drive chain 27 engageable in its rearward end portion about a preselected driven sprocket of the conventional cluster of driven sprockets, or so-called derailleur gears, indicated broadly at 28, mounted upon bicycle rear axle 12 in side-by-side relationship. Bicycle A embodies the expected system for interconnecting drive sprocket 25 or 26, as the case may be, with the particular driven sprocket of cluster 28 to produce the desired gear ratio; it being recognized that such system is not a part of the present invention.

From the foregoing it may be observed that frame F is of unique construction by reason of the downward and rearward inclination of rods 11, 11' which pass considerably below the upper end of seat post 8 to present a substantial zone of clearance shown at s permitting bicycle A to be readily mounted by a member of either sex thereby obviating the heretofore accepted necessity of a separate model for each sex, whereby considerable economy in production is effected. A rider may step easily through clearance zone s without interference which would not have been possible with the well known classical bicycle construction involving a horizontal bar extending between the upper ends of the front post and the seat post. Additionally, and nonetheless noteworthy, is the fact that rods 11,11' by reason of their continuity from front post 3 to rear axle 12 endow frame F with a marked sturdiness and structural stability and integrity.

Referring now to FIGS. 5–9, inclusive, the construction of pedals 24,24' will be more fully described. As the same are of like construction only pedal 24 will be described in detail for illustrative purposes. Pedal 24 is of the underslung character, that is, wherein the foot supporting portion is located beneath the normal axis of rotation of the pedal, as indicated at x, as established by the axis of crank arm 29 secured within an internally threaded opening 29' at the hub remote end of pedal crank 23. Such underslung pedal is of the general type set forth in my copending application Ser. No. 547,574 filed Feb. 6, 1975, now U.S. Pat. No. 4,030,774. Foot pedal 24 embodies an annular, relatively thin support plate 30 provided with a peripheral, inwardly turned continuous reinforcement flange 31 and with a central outwardly opening recess 32 having a side wall 33 of substantially like extent as flange 31 and a relatively enlarged opening 34 in the base 35 thereof. Projecting through opening 34 is the outer, smooth surfaced end of crank arm 29 about which there is encirclingly disposed, within recess 32, a ball bearing assembly 38, press-fitted between crank arm 29 and recess side wall 33, so that the outer race 39 of said assembly 38 bears tightly against the inner face of recess side wall 33, and the inner ball bearing race 40 bears equally tightly against crank arm 29. An annular spacer 36 is presented between said ball bearing assembly 38 and the adjacent portion of crank 23; a shoulder 37 formed on the outer end of crank 29 serves to retain said assembly 38 against shifting axially of crank 29. By means of such arrangement pedal 24 is adapted for free rotation about the axis x of pedal crank arm 29. Secured as by rivets upon the normally lower portion of flange 31 is the inner marginal portion 41 of a foot support member 42 fabricated of relatively thin guage sheet stock, such as hardened steel, stainless steel, and the like. Said foot support member 42 projects outwardly of annular support 30 and is of generally dished or downwardly recessed character in cross-section, for rigidifying purposes, with the depth of such decreasing toward the outer extremity thereof. The upper end margins 43,43' of said member 42, which receive the operator's foot, are located substantially below crank axis x and with the outer extremities of said end margins 43,43' and outer side margin 44 of foot member 42 being aligned with the normally bottom portion of recess side wall 33. Thus, the user's foot will be supported below axis x as contradistinguished from existing pedal constructions wherein the user's foot rests above such axis. Fixed, as by rivets r, to the under face of foot support member 42 in its central portion is the lower end of a toe clip 45 formed from a relatively narrow, single length of thin gauge stainless steel or the like to constitute a strap, the lower end section 45' of which progresses forwardly and upwardly of member 42 in a slightly arcuate fashion to a point p located a predetermined distance forwardly of pedal 24 adequate to accommodate the projecting portion of the user's foot, at which point p said clip 45 is reversely or returningly bent to present a rearwardly extending upper section 45" terminating spacedly above foot support 42 for securement by a fastener 46 to the outer end of a bracket 47 fixed at its inner, relatively widened end 48 upon the normally upper portion of flange 31, as by rivets 49 or the like. It is to be seen that the single band toe clip 45 is located within a plane perpendicular to pedal rotation axis x; and being fully opened to the outer side presents no obstacle to the uninhibited lateral movement of the user's foot, in and from, disposition upon member 42. This wide-openness of clip 45 is a feature of extreme importance, as in the event of an emergency the user need merely slide the foot laterally outwardly to free the same for undertaking such action as may be required to avoid injury as distinguished from the current necessity for bicycle riders to pull their feet rearwardly from disengagement of toe clips with attendant crucial time delay and possible entanglement. Present day toe clips are overly confining and hampering in use, denying the operator the requisite freedom of movement in an emergency.

Disposed about flange 31 between the engaged portions of support member 42 and bracket 47 are front and rear reflectors 50,50' as fabricated of a suitable plastic and being secured preferably by an adhesive.

Pedals 24,24', being thus of underslung character, present the rider's feet in substantially immediate adjacency to the ground or other support surface without sacrifice of adequate rod clearance. Thus, the rider may sit closer to the ground as in the order of 1¼" than with current bicycles whereby mounting and dismounting are faciliated, promoting greater safety to the rider in the event a hazardous situation requires rapid dismounting. Furthermore, by reason of the disposition of foot support members 42 below the respective axes, the center of gravity of pedals 24,24' is established below such axes so that said pedals, when in disuse, will at all times remain in upright condition with the associated toe clips 45 extending forwardly so that the rider is spared necessity of having to rotate the pedal into appropriate attitude for receiving the rider's foot as is the case with present day bicycles wherein the center of gravity of the pedals coincides with the axis of rotation thereof, and with the top of such pedals being located above the center of gravity so that said pedals are not biased into one position or another. Manifestly if current bicycle pedals are provided with a toe clip of customary character the center of gravity is normally located well above the pedal rotational axis so that the pedal will be prejudiced into an upside down position when in disuse.

Figure 9:
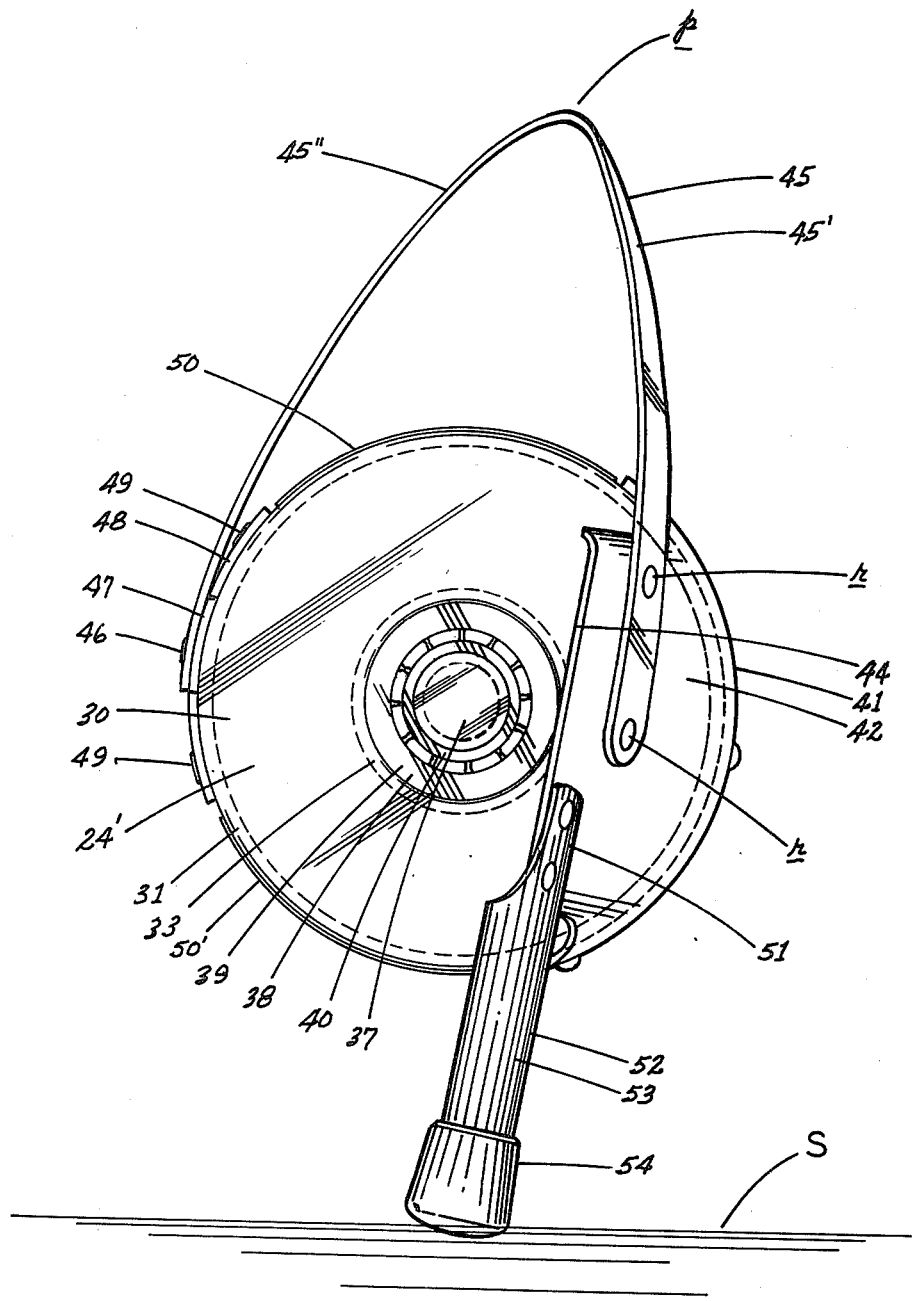
FIG. 9 is a side elevational view of the foot pedal incorporating a support stand and illustrating the same with the stand in operative position.

With particular reference now being made to FIG. 9 foot member 42 may be optionally provided with a support stand of the general broad type set forth in U.S. Pat. No. 3,877,726 issued Apr. 15, 1975. Thus, secured to the under face of, preferably, each foot member 42 in the rearward region thereof adjacent the outer side edge 44 proximate end edge 43 is the mounting extension 51 of a bicycle support stand 52 embodying a leg 53 as of circular cross section, being tubular or solid, projecting normally rearwardly of foot member 42 beyond edge 43 thereof. Engaged upon the free end extremity of leg 53 may be a wear cap 54 as of rubber or the like. Support stand 52 will constitute a torque arm so as to cause the associated pedal to automatically rock downwardly when the user's foot is removed to present support stand 52 in operative attitude. If desired, a weighting element (not shown) may be provided within leg 53 for gravitational purposes. It will be seen that support stand 52 when considered with the associated pedal 24 or 24', as the case may be, in operative disposition extends normally rearwardly of such pedal and is offset from a vertical axis passing through axis x so as to provide the requisite bias for rocking said pedal downwardly in an automatic fashion when the pedal is in disuse. The length of leg 53 is designed to span the distance between the related pedal and the support surface, indicated S, when the bicycle is inoperative and is slightly canted for stable positioning.

Figure 10:
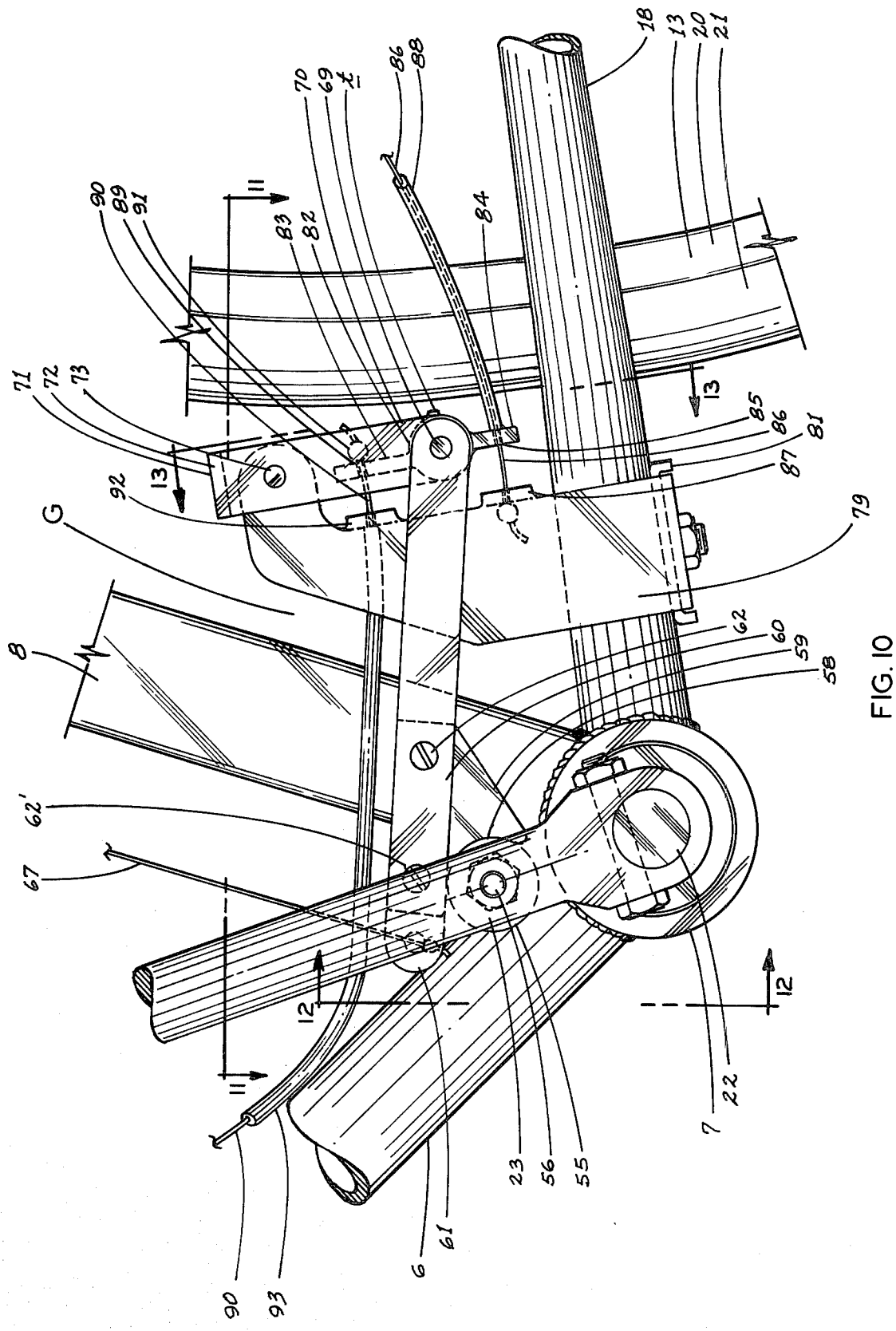
FIG. 10 is a side view of the brake control assembly taken on the line 10—10 of FIG. 2.

Caliper brakes 16,17 of bicycle A are uniquely operated through requisite action of the bicycle rider's feet, rather than by the customary hand controls mounted upon bicycle handlebars. Such operation is effected through the brake control assembly G illustrated in detail in FIGS. 10–13, inclusive, and comprising a roller bearing 55 mounted, as by a bolt 56, upon pedal crank 23 proximate and above the connection of the latter to hub shaft 22 for disposition inwardly thereof through means of a spacer sleeve 57. Roller bearing 55 cooperates with the forwardly presented concave operative edge 58 of a cam depending from a push link 60 (FIG. 10) extending lengthwise of bicycle A and of two-part construction, being constituted of complementary outer and inner arms 61,61' the forward portions of which are in planar parallel, immediately spaced relationship for reception of the upper end of a cam 59 therebetween which is held by scews 62,62'. Rearwardly of cam 59 arms 61,61' diverge from each other, as at 63,63', respectively, then return to planarwise parallel relationship throughout the extent of their rearward portions 64,64', respectively, for defining a relatively enlarged intervening spacing 65 to be described below. Arms 61,61' in their extreme forward portions are interconnected by a pin 66 for securement to the lower end of a parking brake release cable 67, the upper end of which latter is affixed to a hand lever 68. The rearward end of lever 68 is pivotally mounted upon frame F just rearwardly of seat post 8, said lever being thus presented laterally outwardly and slightly downwardly of rod 11 for convenient manipulation by the rider. At their rearward ends, portions 64,64' of push link arms 61,61' are swingably engaged, as by a cross pin 69, to the lower ends of legs 70,70', respectively, of a double or U-shaped link 71 having an upper bight or connecting portion 72. Link 71 is pivoted by a pin 73 extending through aligned openings in legs 70,70', as at 74,74', in the upper end portions thereof, and the bore 75 of a spacer sleeve 76 between said legs 70,70', which sleeve passes snugly through an aperture 77 formed in the upper end of a stationary bracket 79; and at the outer end of said sleeve 76 the latter is peened over to hold a washer. A pin 73 is held against displacement by a set screw 80 threaded into sleeve 76 transversely thereof. Bracket 79 is upstanding, projecting above frame bar 18, located laterally outwardly thereof, and integrally incorporates a substantially planarwise perpendicular base 79' which, beneath the adjacent under portions of frame bars 18,18', is detachably engaged to frame F by bolting to a plate 81 welded or otherwise fast to bars 18,18' (FIG. 13).

Bracket 79 projects through the enlarged spacing 65 between rear portions 64,64' of push link arms 61,61'. Swingably disposed on cross pin 69 and held thereon by a set screw t for pivotal movement with respect to push link 60 is the sleeve forming body of an equalizer lever 82 embodying upper and lower extensions 83,84, respective, above and below pin 69. Lower extension 84 of lever 82 is provided with an aperture 85 of requisite diameter for extension therethrough of the control cable 86 for rear wheel caliper brakes 17; said cable 86 at its forward end being anchored upon a boss 87 extending laterally from bracket 79. Rearwardly of equalizer lever lower extension 84, brake control cable 86 is encased in the usual flexible sheath 88 which at its forward end abuts against the rearward face of said lever extension 84. The rearward ends of cable 86 and sheath 88 are connected to rearward caliper brakes 17 in the usual manner. Equalizer lever upper extension 83 contains an aperture 89 of sufficient diameter for extension therethrough of the rearward end of a control cable 90 for front caliper brakes 16; said cable 90 having an enlarged head-forming element 91 on its rearward end for inhibiting loss of engagement with said lever extension 83. Forwardly of extension 83, brake control cable 90 passes through an apertured boss 92 provided on bracket 79, and forwardly thereof is enclosed within a flexible sheath 93. Sheath 93 at its rearward end abuts against the forward face of boss 92, and cable 90 and sheath 93 are connected to front caliper brakes 16 in customary fashion.

From the foregoing it will be seen that in order to set brakes 16,17 for resting travel of bicycle A the rider will effect a back-pedaling action causing roller bearing 55 to be brought into forceful engagement with cam 59 causing a rearward force thereon to be transmitted to push link 60 which latter, in turn, is moved axially rearwardly thereby bringing about a pulling upon brake release cable 67 which action locks hand lever 68 downwardly about the pivot thereof. Concurrently, such rearward movement of push link 60 will cause swinging of equalizer lever 82 so that lower extension 84 will effect a rearward pushing on cable sheath 88 with cable 86 being held by boss 87; and with a concurrent rearward pulling upon cable 90 relative to sheath 93 so that brakes 16,17 are applied. Accordingly, through foot action alone brakes 16,17 are brought into full braking condition and will remain in such state despite removal of the rider's feet from the pedals until the brakes have been released through upward pulling of hand lever 68 which causes link 60 to be moved returningly forwardly thereby effecting a reverse rocking of equalizer lever 82 for removing the pushing and pulling forces acting on sheath 88 and cable 90, respectively. It is to be particular noted that for effecting braking action foot pedal 24 will be in full upper position, while concurrently companion foot pedal 24' will be in full downward position so that with brakes 16,17 set, pedal 24' is presented for disposing stand 52 mounted thereon for engaging the support surface S (see FIG. 1).

With reference to FIGS. 14, 15 and 16 the handlebar adjustment assembly of bicycle A will be described. Post 3, which is of the usual tubular character, slideably, axially receives the lower vertical portion 95 of stem 4 which latter in its upper portion 95' is turned forwardly, in goose-neck fashion, to provide an extension 96, the forward extremity thereof being concave, formed on a radius, as at 97, for snugly accepting the complementary portion of handlebar 5. Stem extension 96 contains a forwardly opening bore 98 which is counterbored, as at 99, forming a stop shoulder 100. Counterbore 99 which opens through the concave forward end 97 of stem extension 95' is internally threaded throughout its extent. Said handlebar 5 substantially intermediate its length contains a pair of diametrically aligned openings 101,102 with the former being in registering relationship with an aperture 103 provided within a mounting plate 104, substantially semi-circular in cross section, being formed on a radius for embracing the adjacent, outer portion of handlebar 5. Extending through aperture 103 and openings 101,102 for projection into counterbore 99 is a bolt 105 having an externally threaded shank 106 engageable with the external threads of a counterbore 99.

Stem 4 at the upper end of the vertical portion 95 thereof is provided with a short bore 107 opening at its upper end into a rearwardly and upwardly opening recess or countersink 108 and communicating at its lower end with a counterbore 109 through which projects the shank 110 of an elongated bolt 111, the head 112 of which rests upon the base of recess 108. The lower end portion 113 of bolt 111 is externally threaded for engaging the internally threaded bore 114 in the base of a locking wedge 115 having an upper bevel or oblique end face 116 for tightly abutting the lower, beveled, or complementarily formed, end face 117 of stem 4. The outer or side surface of wedge 115 is of corrugated or serrated configuration having a series of vertically extending circumferentially spaced ridges 118 and intervening grooves 119. Ridges 118 are adapted to "bite" into the inner face of the wall of post 3 upon tightening of bolt 111 as discussed hereinbelow.

The upper end of post 3 is externally threaded as at 120, for engaging the internal threads of a collar 121 which is reduced at its upper end, as at 122, for close acceptance of stem portion 95 (FIG. 14). Said collar 121 is adapted upon tightening on past 3 to frictionally engage stem 4 to maintain same in selected position so as to control the vertical disposition of handlebar 5. Thus, upon loosening of collar 121 stem 4 may be suitably shifted vertically into desired position and maintained against vertical displacement upon tightening of said collar 121. Thereupon bolt 111 may be tightened as by application of a suitable tool to the allen-type head 112 thereof so that the same will cause locking wedge 115 to be relatively drawn upwardly and slightly laterally as the confronting bevel end faces are moved relatively with respect to the other to drive ridges 118 into the inner face of the wall of post 3 whereby stem 4 is locked against rotative movement about the axis of bolt 111 to assure the stable positioning of handlebars 5 in its predetermined horizontal disposition.

At its forward or head end, bolt 105, immediately forwardly of mounting plate 104 is affixed to the upper end of a depending lever arm 123 which inclines slightly forwardly and at its lower end carries an enlarged disc 124, the forward face of which mounts, as by an adhesive, a reflector 125. It will be seen that the manipulation of bolt 105 is facilitated by utilizing lever 123 as a torque arm so that upon loosening of bolt 105 the same is drawn forwardly to remove mounting plate 104 from fast abutment against the concave end 97 of stem extension 95' to allow forward shifting of handlebar 5 an adequate distance from said concave face 97 so that the same may be freely swung about an axis coincident with the longitudinal axis of bolt 105, as through an angle of 180°, to present the associated handles h into a reverse condition, such as that shown in phantom lines in FIG. 1. With handlebar 5 thus swung to the newly selected position, the operator need merely effect a retightening of bolt 105 through rotation of lever 123 to return handlebar 5 into tightly engaged condition between mounting plate 104 and stem extension 95'. The entire operation for altering disposition of handlebar 5 would consume scarcely 10 seconds and without there being any detachment of handlebar 5 from bicycle A since bolt 105 need not be fully loosened to permit of requisite swinging. It is to be especially noted that since brakes 16,17 are foot controlled, there is obviated the concern which would be involved if the usual hand-operated brake levers were disposed on handlebar 5; the presence of which would prevent the easily achieved positioning of handlebar 5 as just described.

During the adjustment of handlebar 5 stem 4 may remain firm against vertical or horizontal shifting by reason of collar 121 and locking wedge 115 as above described.

Shift levers 126,127 controlling cables 126',127', respectively, are provided for operation of derailleur gears 28 but are positioned downwardly of the forward portion of stem 4 (FIGS. 15,16) being mounted upon aligned lateral extensions 128,129, respectively, with a bracket 130. Bracket 130 embodies a central upwardly extending portion 131 which is integrated with stem 4, as by brazing, casting, etc. It will be observed that by reason of mounting shift levers 126,127 upon bracket 130 beneath stem 4 and, hence, beneath handlebar 5, the same are removed from any potential contact with the rider should the latter fall forwardly against the stem and handlebar in the event of an accident, as by a violent arresting travel of the bicycle. Thus, stem 4 is protectingly disposed between said shift levers 126,127 and the rider as contradistinguished from the current positioning of such levers upon the handlebar 5 for projecting thereabove and, hence, constituting a hazard to the rider.

With reference now being made to FIGS. 17, 18 and 19 seat adjustment assembly 9 will be described. Seat post tube 8 is preferably of quadrilateral cross-section, as square, and open at its upper end, as at 132. Seat post tube 8 on one side wall, such as the rear wall at 133, is provided with a relatively short slot-like opening 134 progressing downwardly from the upper margin thereof, and with there being opposed apertured lugs 135,135' on either side of said opening 134 for receiving a screw (not shown) for drawing said lugs 135,135' toward each other to cause seat tube 8 to firmly grip the confronting portion of an intermediate tube 136; said latter is of reduced cross-section relative to the inside of seat post tube 8 and is substantially coaxial with tube 8. The major portion of the length of intermediate tube 136 is disposed within seat post tube 8 but in its upper portion, as at 137, projects above the open upper end 132 of seat post tube 8. Intermediate tube 136, which is open at each of its opposite ends, is provided on its rear side, 138, confronting rear wall 133 of seat post tube 8, and at the upper end thereof with an inwardly extending tongue 139 for selected reception within vertically spaced upper and lower apertures 140,141 of an interior tube 142 for maintaining the latter in selected position relative to seat post tube 8. At its upper extremity interior tube 142 mounts seat 10 which is of conventional character embodying a base member 143 for supporting coil spring 144 which latter bear at their upper ends against the under face of seat 10 for cushioning purposes.

Interior tube 142 projects downwardly through intermediate tube 136, being substantially coaxial therewith, and projects in its lower portion beyond the lower end of said intermediate tube 136, as at 145. Within the central portion of its normally forward wall 146, interior tube 142 is provided with an elongated vertical slot-like guide opening 147 through which extends a pin 148, the outer end of which is secured to the confronting wall of intermediate tube 136, as at 149, and with the inner end of said pin 148 terminating within interior tube 142; the axis of pin 148 being normal to the longitudinal axis of interior tube 142. Engaged upon pin 148, within interior tube 142, is the upper end of a tension spring 150 which extends downwardly within said interior tube 142 for securement at the lower end thereof to a pin 151 which extends through opposed side walls of said interior tube 142 for reception within aligned bores 152 provided in a generally rectangular guide bushing 153 extending about the lower end of said interior tube 142; said bushing being formed of relatively rigid material, such as plastic and being dimensioned and contoured for movement within seat post tube 8 with interior tube 142.

From the foregoing it will be observed that for normal usage the rider will cause tongue 139 to be lockingly received within aperture 141 thereby presenting seat 10 in full upper or riding position in which condition pin 148 will be disposed at the lower end of guide opening 147 and with spring 150 being unstressed. It should be noted that seat post 8, together with the associated seat adjustment assembly 9, is canted slightly rearwardly through securement of the same upon hub 7 which canting conduces to retention of tongue 139 within aperture 141 by reason of the gravitational factor. When the rider approaches a stopping juncture, by simple forward movement of the body, while support on seat 10, he will cause the seat 10 to be moved slightly forwardly thereby shifting interior tube 142 commensurately forwardly sufficiently for effectively releasing tongue 139 from aperture 141 whereupon interior tube 142 is freed for sliding downwardly with concomitant relatively upwardly sliding movement of pin 148 within guide opening 147 for presentation of upper aperture 140 in alignment with tongue 139. The rider's weight will thus cause such downward movement of interior tube 142 effecting a stressing of tension spring 150. With tongue 139 engaged within upper aperture 140, seat 10 is in lowered condition and the rider may dismount in a comfortable, facile fashion with his feet readily contacting the support surface and with seat 10 being disposed downwardly of his spine in the event the bicycle were for any reason struck from the rear. The seat would not be driven into the rider's back with potential injury as would be the case with existing bicycle constructions when a rider has dismounted but has not removed himself from the standing, straddling position adopted as when waiting for a traffic light change or the like.

When the rider is ready to resume travel, through appropriate manipulation of his body he merely causes a mere slight forward pulling upon seat 10 for drawing interior tube 142 forwardly for relative withdrawal of tongue 139 from aperture 140 and permits interior tube 142 to be shifted upwardly under release of the tension on spring 150 whereby interior tube 142 is moved upwardly returning seat 10 to riding position whereupon tongue 139 is latchingly received within aperture 141 through slight rearward movement of seat 10 and thereby resecuring seat 10 in riding position. Accordingly, the unique seat adjustment assembly 9 of the present invention permits of a simple yet highly reliable system for lowering and raising of seat 10 at appropriate junctures, but particularly for stops when the rider must leave the seat for the duration of the interval of the stop. The present invention assures that the seat is not poised in a position of potential hazard to the rider in the event of a forwardly directed forceful impact upon the bicycle. The body movements controlling the operation of seat adjustment assembly 9 are easily effected and require no special skill on the part of the operator.

Figure 20:
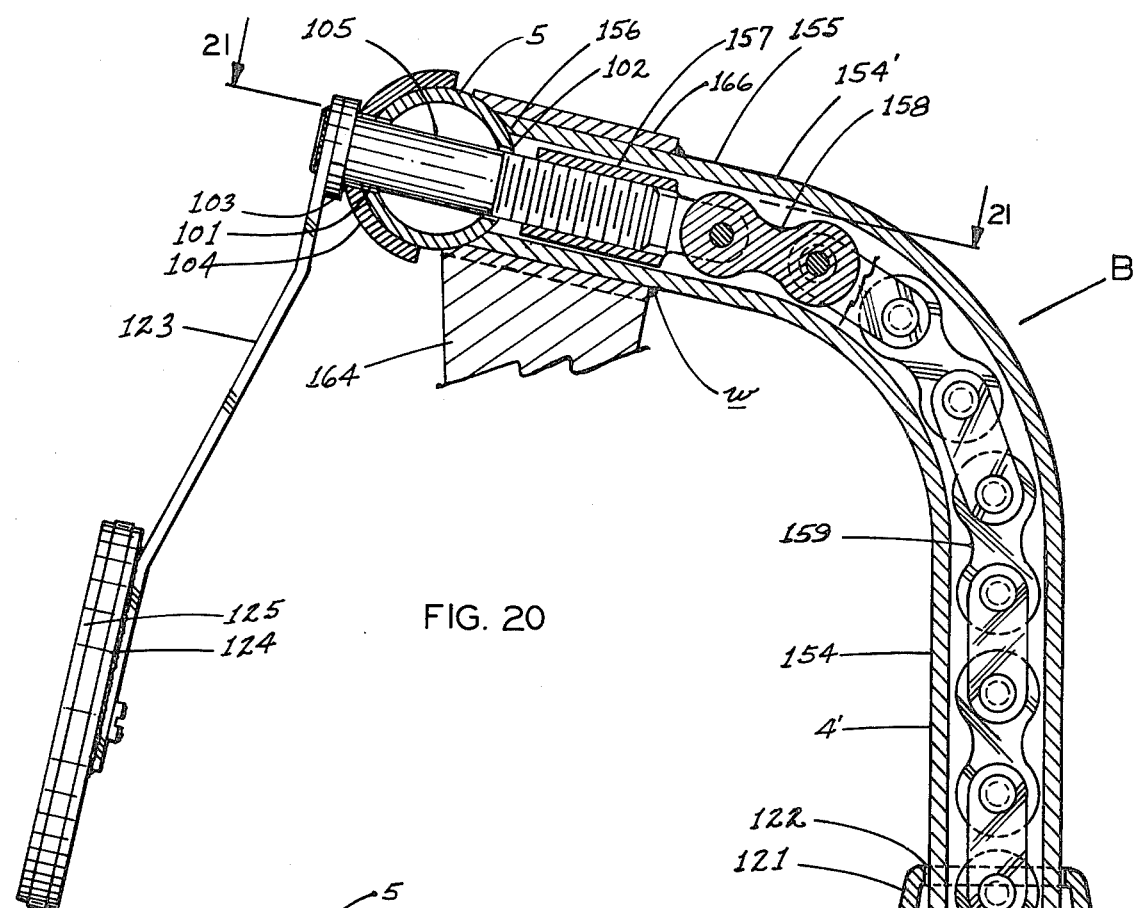
FIG. 20 is a vertical transverse sectional view of another form of handlebar control assembly constructed in accordance with and embodying the present invention taken substantially on the line 14—14 of FIG. 2.
Figure 21:
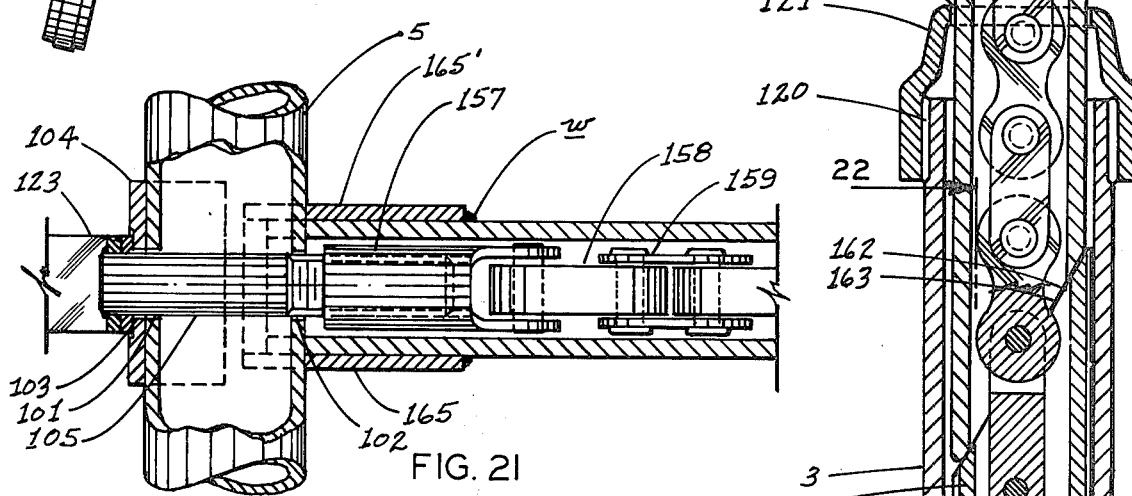
FIG. 21 is a horizontal transverse sectional view taken on the line 21—21 of FIG. 20.
Figure 22:
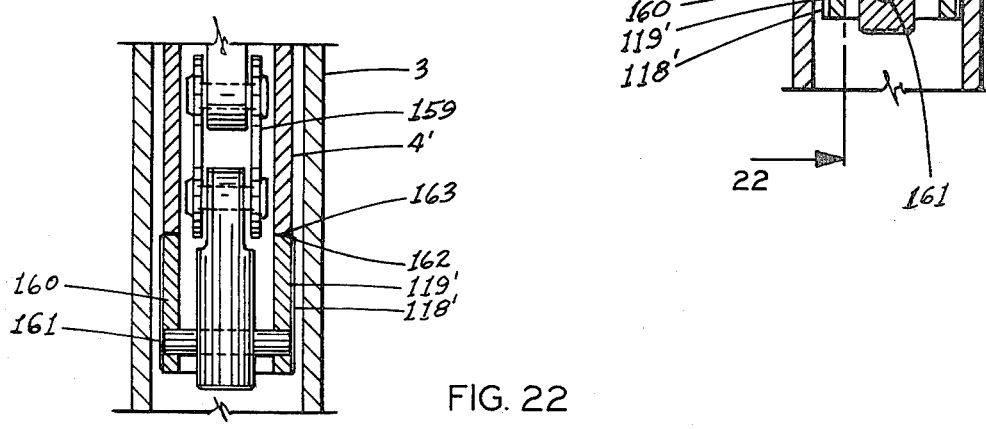
FIG. 22 is a vertical transverse sectional view taken on the line 22—22 of FIG. 21.

Turning now to FIGS. 20, 21, and 22 another form of handlebar adjustment assembly embodying the present invention is illustrated and identified generally at B. As certain components of this assembly B are the same as those described above in conjunction with the assembly depicted in FIGS. 14, 15 and 16, like reference numerals will be utilized to identify the same components for facilitating description. Post 3 slideably receives the lower vertical portion 154 of stem 4' which is of like exterior contour as stem 4 above described, having an upper portion 154' which is turned forwardly in gooseneck fashion to provide an extension 155 which latter at its forward end is also concave, being formed on a radius, as at 156. However, said stem 4' throughout its entire extent is of tubular character with the forward end of its bore opening through its concave face 156. The threaded inner end of bolt 105 extends into the interior of stem 4' for engagement with the internal threads of a sleeve 157 having a cross-section permitting of movement within said tube 4'; which sleeve at its inner end is rigidly fixed to the forward end link 158 of a pull chain 159 which may be as illustrated of single link-double link alternating character. Chain 159 progresses rearwardly through stem stem 154' and thence downwardly through the lower vertical portion 154 of said stem 4' for securement of its lower end to a tubular locking wedge 160 by means of a pin 161 extending substantially diametrally of the bore of said wedge 160. Wedge 160 is substantially identical with locking wedge 115 above described, but with the exception of requisite modification for engagement to chain 159 rather than a threaded bolt. The upper end face 162 of wedge 160 is beveled or oblique for tightly abutting the lower, beveled or complementarily formed end face 163 of stem 4'. Wedge 160 is provided on its exterior surface with alternating ridges and grooves 118',119' which correspond to the ridges 118 and grooves 119 of locking wedge 115 above described and coact in the same manner with the interior surface of post 3.

It will be seen from the foregoing that handlebar 5 is maintained in selected mode by inward threading of bolt 105 within sleeve 157 which latter is drawn relatively forwardly within stem extension 154' causing an upward and forward pulling on chain 159 whereby wedge 160 is drawn into tight disposition within post 3 by means of ridges 118' "digging" into the inner face of post 3. In order to alter the disposition of handlebar 5 so as to change the attitude of the handles thereof, as between racing and touring position, bolt 105 is loosened through appropriate manipulation of lever 123 to an extent permitting freedom of rotation of handlebar 5 through an angle of 180°. Thereupon bolt 105 is tightened and made stable in such selected position.

Another form of bracket, indicated generally at 164 for mounting the gear shift levers (not shown) may be utilized with bicycle A, which bracket is substantially similar to bracket 130 above described, but differs in the manner of securement upon the bicycle stem. Bracket 164 embodies a pair of centrally located upstanding arms 165,165' which at their upper ends are interconnected by a downwardly concave bight 166 adapted to form a saddle upon the upper face of the forward extension of the associated stem 4 or 4', as the case may be, and with said bight 166 and arms 165,165' being made rigid with the stem as by weldments, as at w. Thus, bracket 164 is formed independently of bicycle A, and fixed thereon whereas bracket 130 is integrally formed with the associated stem. Furthermore, the bight portion 166 of bracket 164 effectively enlarges the forward end of the associated stem and thereby provides handlebar 5 with a relatively enlarged socket within which to be locked.

Figure 23:
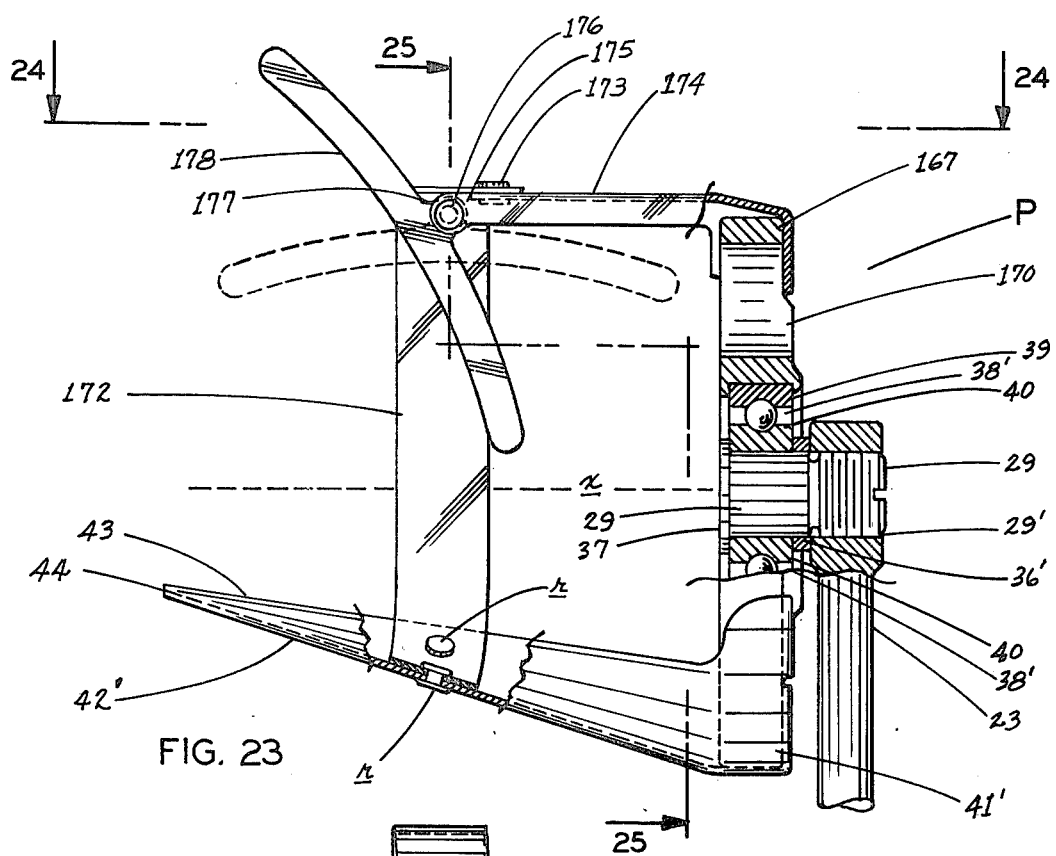
FIG. 23 is a rear view of another form of foot pedal constructed in accordance with and embodying the present invention, being in partial section, and taken substantially on the line 5—5 of FIG. 2.
Figure 24:
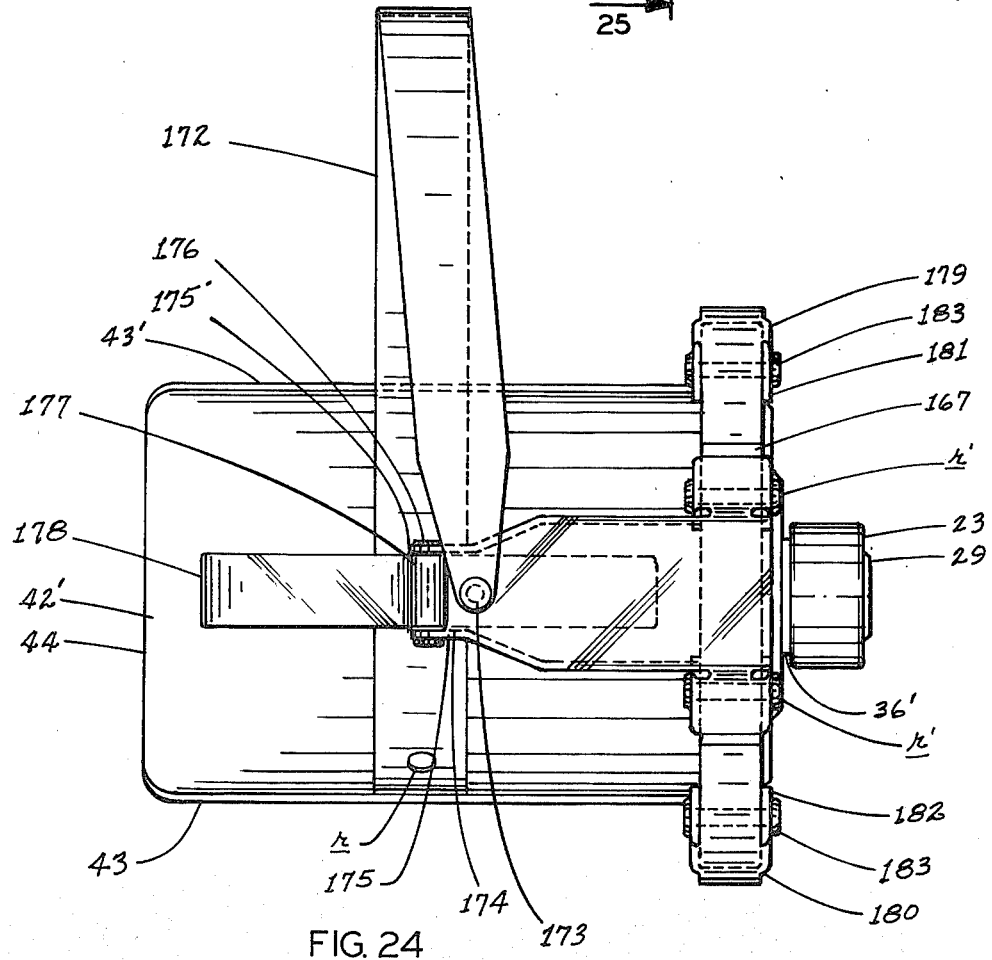
FIG. 24 is a top plan view taken on the line 24—24 of FIG. 23.
Figure 25:
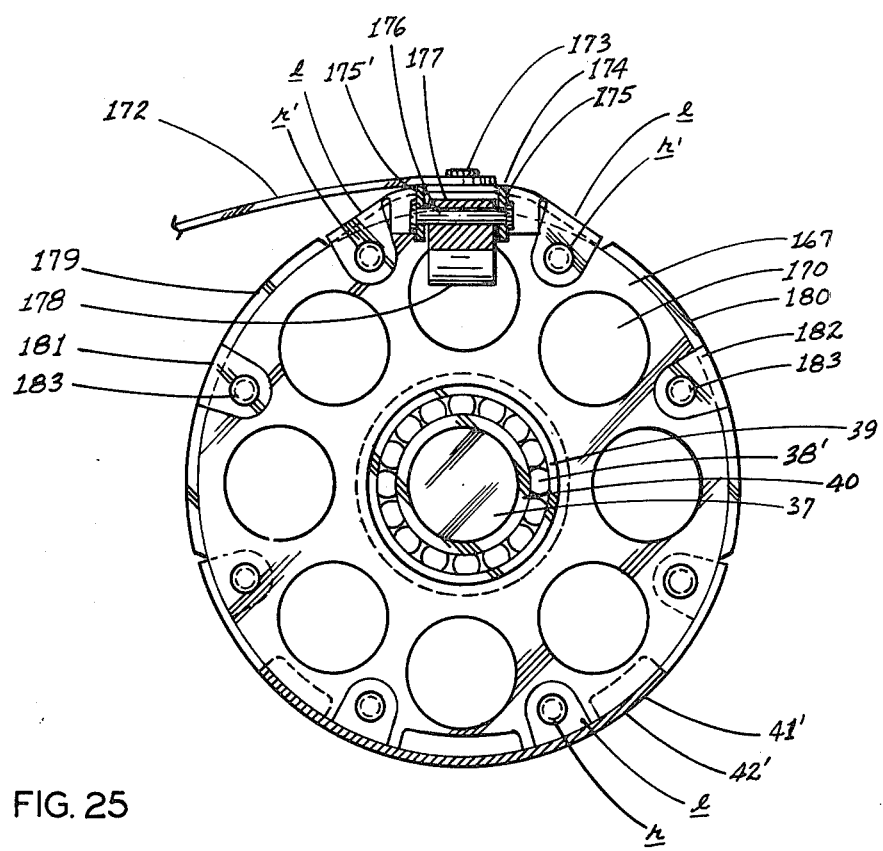
FIG. 25 is a vertical transverse view, in partial section, taken on the line 25—25 of FIG. 23.
Figure 26:
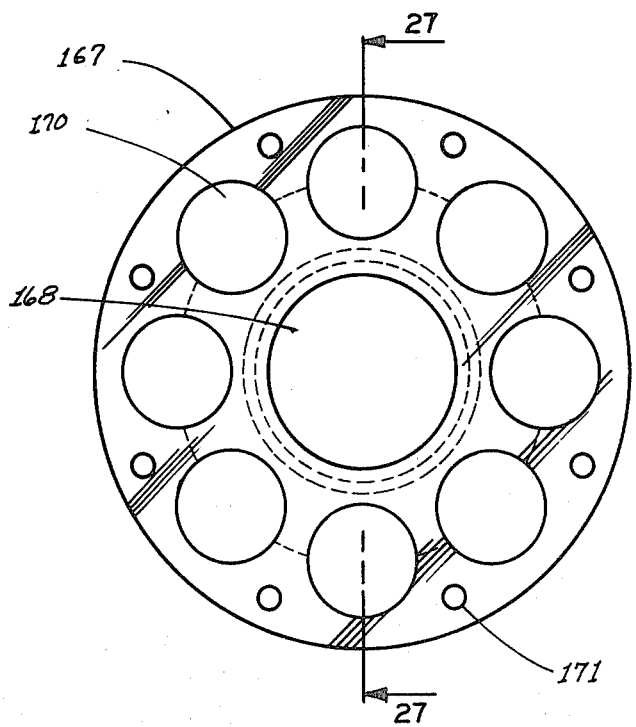
FIG. 26 is an elevational view of the support plate of the foot pedal illustrated in FIG. 23.
Figure 27:
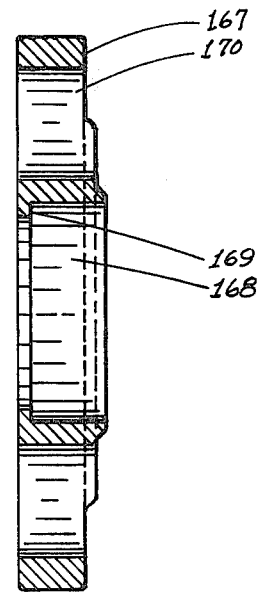
FIG. 27 is a vertical transverse sectional view taken on the line 27—27 of FIG. 26.

Referring now to FIGS. 24-27, inclusive, another construction of a foot pedal of the underslung character corresponding generally to pedals 24,24' described hereinabove may be utilized with bicycle A. Such pedal, indicated generally at P, embodies substantially like components as those incorporated in pedals 24,24' and with such components being in substantially like relationship. Thus, pedal P incorporates an annular support plate 167 which is preferably cast as of aluminum and embodies an enlarged central opening 168 for accepting a ball bearing assembly 38' which corresponds to ball bearing assembly 38 above described; there being an inwardly directed short flange 169 formed on the outer side of opening 168 for ball bearing retention purposes. Said ball bearing assembly 38' is press-fitted between crankarm 23 and the side wall of said opening 168, with there being an annular spacer 36' between said assembly 38' and the adjacent portion of crank 23. Surrounding central opening 168 is a multiplicity of annular satellite openings 170 for weight reduction purposes. Secured in a manner to be described upon the normally lower peripheral portion of support plate 167 is the inner marginal portion 41' of a foot support member 42' which is in all respects fundamentally similar in construction to foot support member 42 hereinabove described; being unitarily formed of rigid plastic, thin guage sheet metal stock, etc. Projecting normally upwardly from the inner face of the inner marginal portion 41' are a plurality of pairs of aligned ears, as at e, which are spaced-apart a distance corresponding to the thickness of support plate 167 so as to snugly embrace same and with such ears being apertured for receiving rivets r which extend through aligned openings 171 provided in support plate 167. Foot member 42' bears the same relationship to support plate 167 as foot member 42 bears to support plate 30 above described so that said foot member 42' is located below the pivot axis x of support plate 167 for the same reasons and purposes as above set forth in conjunction with pedals 24,24'. Engaged to the under face of foot support member 42' is the lower end of a toe clip 172 which is in all respects substantially identical with toe clip 45 above discussed, being formed from a relatively narrow, single length thin gauge stainless steel or the like and with its upper end being secured by a rivet or other fastener 173 to the outer end of a bracket 174 which is substantially identical with bracket 47 above described but which embodies at its inner end a plurality of pairs of aligned ears e for disposition on either side of the normally upper peripheral portion of support plate 167 and for engagement to said support plate by rivets r' which progress through aligned openings 171 in said plate 167. Said bracket 174 outwardly of fastener 173 and on its under surface mounts a pair of apertured bosses 175,175' spaced-apart fore and aft bicycle A for receiving a pivot pin 176 which passes through an apertured boss 177 extending from the upper central portion of an arcuate, normally downwardly concave foot retaining bar 178. Thus, said bar 178 is rockable about the axis of pin 173 from inoperative, open or upwardly swung position, as shown in full lines in FIG. 23, and into operative or downwardly swung position as shown in phantom lines in FIG. 23. By reason of its normal bias bar 178 will be normally in inoperative position when pedal P is in disuse. However, when the rider places his foot upon foot support member 42 the foot will strike the depending portion indicated 178' of bar 178 and thereby cause the same to be rocked downwardly into operative position immediately above or upon the upper surface of the rider's foot and thereby serve to promote retention upon foot member 42'. However, said bar 178 does not provide any obstruction to removal of the rider's foot which may be withdrawn rearwardly or moved laterally outwardly as desired.

Engaged also upon the periphery of support plate 167 between bracket 174 and foot support member 42' are forward and rearward reflectors 179,180, respectively, which are retained in position by U-shaped clips 181,182, respectively, the arms of which are of like construction as ears e or e' and are interengaged by rivets 183 passing through aligned openings 171 in support plate 167. Pedal P is of unique construction utilizing extremely simple means for integrating the various components and being amenable to high volume, low cost assembly.

Figures 28, 29, 30:
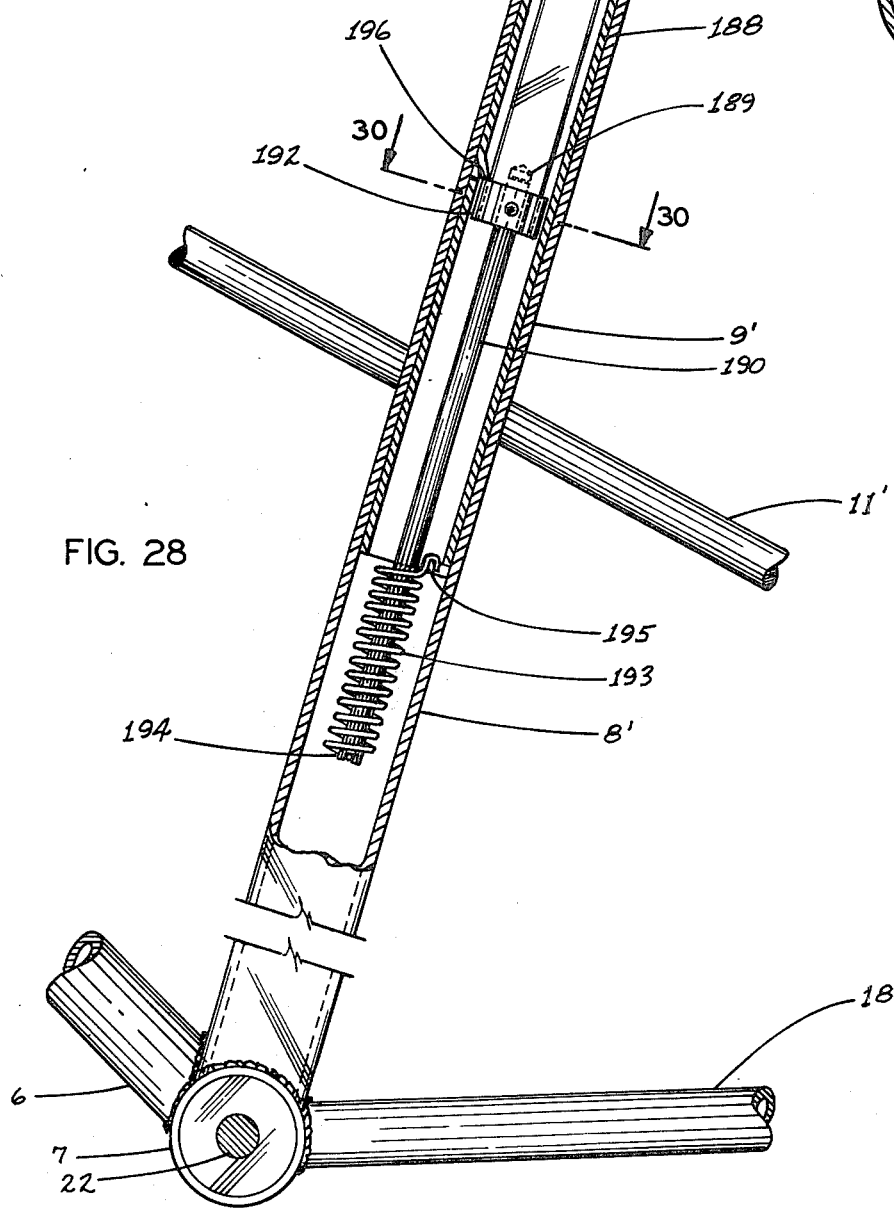
FIG. 28 is a vertical view in partial section of another form of seat control assembly constructed in accordance with and embodying the present invention, taken substantially on the line 17—17 of FIG. 2.
FIG. 29 is a transverse sectional view taken on the line 29—29 of FIG. 28.
FIG. 30 is a horizontal transverse sectional view taken on the line 30—30 of FIG. 28.
Figure 31:
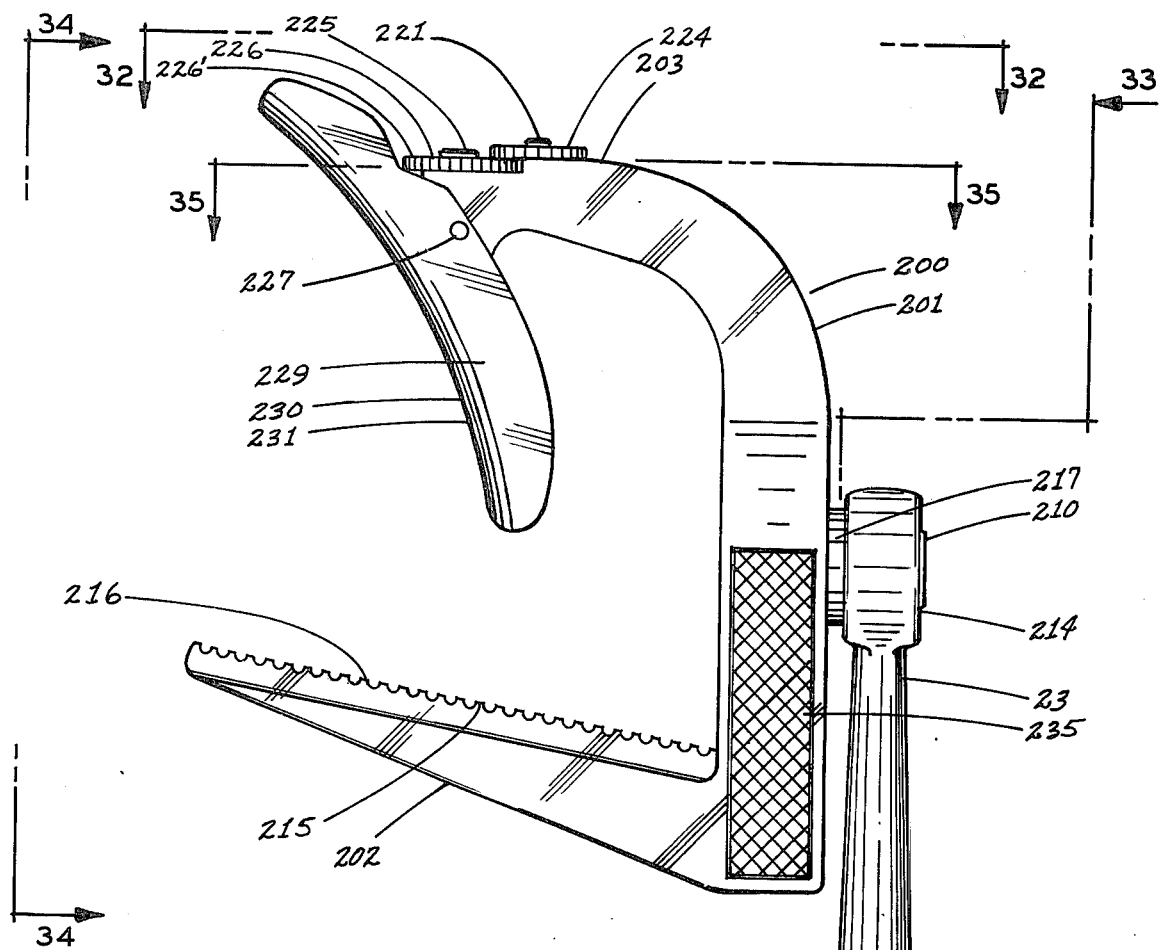
FIG. 31 is a rear view of a further form of foot pedal constructed in accordance with and embodying the present invention being taken substantially on the line 5—5 of FIG. 2.

Referring now to FIGS. 28, 29 and 30, another form of seat adjustment assembly, indicated at 9', may be utilized if desired, with bicycle A incorporating a seat supporting solid bar 184, of quadrilateral cross-section, preferably square, in lieu of the interior tube 142 as used with seat adjustment assembly 9 above described. It has been found that bicycles of foreign manufacture generally utilize a solid post, such as bar 184 and with a seat post tube which is circular in cross-section rather than four sided, and thus assemby 9' is designed for accommodating same. For purposes of brevity it is understood that components of seat adjustment assembly 9' which are identical with components of assembly 9 will bear like reference numerals. However, seat post tube 8' is, as stated, annular in cross-section. Bar 184 incorporates vertically spaced apart rearwardly opening upper and lower notch-like openings 185,186, respectively, for selected reception of a tongue 187 turned inwardly from the upper rear margin of an intermediate tube 188, substantially coaxial with seat post tube 8' and disposed therein, but with the tongue bearing upper end projecting above the upper open end 132 of seat post 8'. Said intermediate tube 188 is maintained in stable relationship with respect to seat post tube 8' by means of the tightening of the screw (not shown) engaging lugs 135,135' so that intermediate tube 188 just as intermediate tube 137 in seat adjustment assembly 9 is held against movement relative to seat post tube 8. Bar 184 in its lower portion is received within the bore of intermediate tube 188 for axial, shiftable movement therein as will be shown hereinbelow. In its lower end face said rod 188 is provided with a downwardly opening, relatively short bore, as at 189, for receiving the upper end of a rod 190 which is of relatively reduced cross-section and being maintained against displacement by means of a pin 191 extending transversely through said rod 190 and the adjacent portions of bar 184 and with the outer ends of said pin being secured within a substantially annular guide bushing 192 encircling the lower end portion of bar 184 and dimensioned for maintaining bar 184 in substantially coaxial relationship to intermediate tube 188 during sliding movement therein. Encircling the lower end portion of rod 190 is an extension coil spring 193, the lower end of which is fixed, as at 194, to the end of rod 190, which latter is free. The upper end of said spring is anchored as by hooking, as upon a finger 195, formed at the lower end of intermediate tube 188. The side wall of intermediate tube 188 immediately upwardly of guide bushing 192 when rod 184 is in full up position, is provided with an inturned projection 196 constituting a stop for abutment thereagainst of said guide bushing 192 to inhibit further upper relative movement of rod 184.

Seat adjustment assembly 9' is operated, or utilized, in the same manner as seat adjustment assembly 9 above described, with bar 184 and seat 10 surmounted thereon being caused to release engagement between tongue 187 and opening 186 for relative dissent of said bar 184 within intermediate tube 188 to cause tongue 187 to become engaged within upper opening 195 for maintaining assembly 9' in full down position. In this latter state spring 193 will be extended and, hence, under stress. When bar 184 is freed from engagement between tongue 187 and opening 185 for freedom to return to full up position, the release of the stress on spring 193 will bring about such movement. Spring 193 should be just strong enough to follow up as the rider moves up, as it were, and is not intended to be of such strength as to lift the rider, just as in the case with spring 150 of seat adjustment assembly 9.

Turning now to FIGS. 31-36, inclusive, a still further form of underslung bicycle pedal, indicated generally 200, may be provided, if desired, for incorporation in bicycle A. Pedal 200, as will be shown, is fundamentally of one piece die cast construction, being fabricated of a suitable durable rigid plastic, such as fiberglass fill plastic or die cast aluminum. Said pedal 200 thus unitarily incorporates an upstanding support post 201 integral in its lower, laterally outward portion with a foot support 202 and at the upper end of said post the same is continuous with a bracket arm 203 projecting laterally outwardly in overlying relationship to the central portion of foot pedal 200. Said post 201 in its lower portion is of relatively increased width and provided with a downwardly opening recess 204 having a rounded upper wall, as at 205, for snug reception of a double sealed ball bearing assembly 206, there being a block-like closure plug 207 received within the lower end of said recess 205 and suitably retained as by screws 208. The upper end of said plug 207 is upwardly concave for accepting the lower portion of ball bearing assembly 206. Centrally said assembly is provided with an opening 209 of appropriate inside diameter for fitting a cap screw 210 having a diametrally enlarged head 211 received within a lateral extension of recess 205 for bearing on its projecting portions against the confronting face of the inner race of assembly 206, as at 212. Said screw 210 at its head remote end is externally threaded, as at 213, for engaging the threaded eye 214 of crank 23 and thus constitutes a crank arm. Said assembly 206 is thus adapted to fit a screw 210 which is of the type utilized generally in all foreign made bicycles as well as the type used in domestically produced bicycles. Accordingly, just as with the underslung pedals hereinabove described, as 24,24' and P, the axis of screw 210 is coincidental with the axis of rotation of pedal 200 as along the line indicated at x which is thus located substantially above the upper surface 210 of foot support 202. Said upper surface 215 is canted downwardly and inwardly to urge the rider's foot to hug the inside of pedal 200 against the adjacent face of post 201 and said upper surface 215 is provided with a treading or corrugation as at 216 for securement with the under surface of the rider's foot. In passing, it will be observed that a customary spacer sleeve 217 is provided between bearing assembly 206 and crank arm 23. In its outer portion bracket arm 203 is bodily enlarged, as at 218, for providing a pair of axially parallel horizontally spaced-apart vertically extending inner and outer bores 219,220, respectively, the diameter of the latter being relatively increased with respect to the former. Bore 219 accommodates the stem of a locking screw 221 with the head thereof 222 at its lower end being received within a countersink 223. The upper end of screw 221 normally projects above bracket arm 203 for accommodating a flanged nut 224. Disposed within outer smooth-surfaces bore 220 is a control screw 225, the upper end of which threaded engages a nut 226, having a peripheral flange 226', which latter in its inner portion underlies the outer portion of the flange or nut 224, which latter accordingly serves as a stop to prevent accidental or unauthorized displacement of screw 225 with nut 226 from bore 220. In its lower portion control screw 225 carries a pin 227 extending transversely therethrough and with its ends projecting through elongated downwardly opening slots 228 formed in opposed portions of the wall of bore 220 for reception at their ends in opposed side wall portions 229,229' of an elongated foot retaining member 230 of similar configuration to foot retaining bar 178 described hereinabove in conjunction with pedal P. Said member 230 is provided with a generally downwardly concave bottom wall 231 extending between said side walls 229,229' and being downwardly concave on its lower surface for generally fitted disposition upon the instep of the rider's foot. By reason of the coaction of cross pin 227 and slots 228, said member 230 may be relatively raised or lowered for proper accommodation with the user's foot so as to be firmly disposed thereon for providing requisite pressure to maintain the foot in operative position, yet concurrently not inhibiting intentional withdrawal of the foot if desired. It will be seen that in order to adjust member 230, nut 224 is loosened and nut 226 is then rotated sufficiently to elevate or lower screw 225 the desired distance and thereupon nut 224 is tightened upon locking screw 221.

Figure 36:
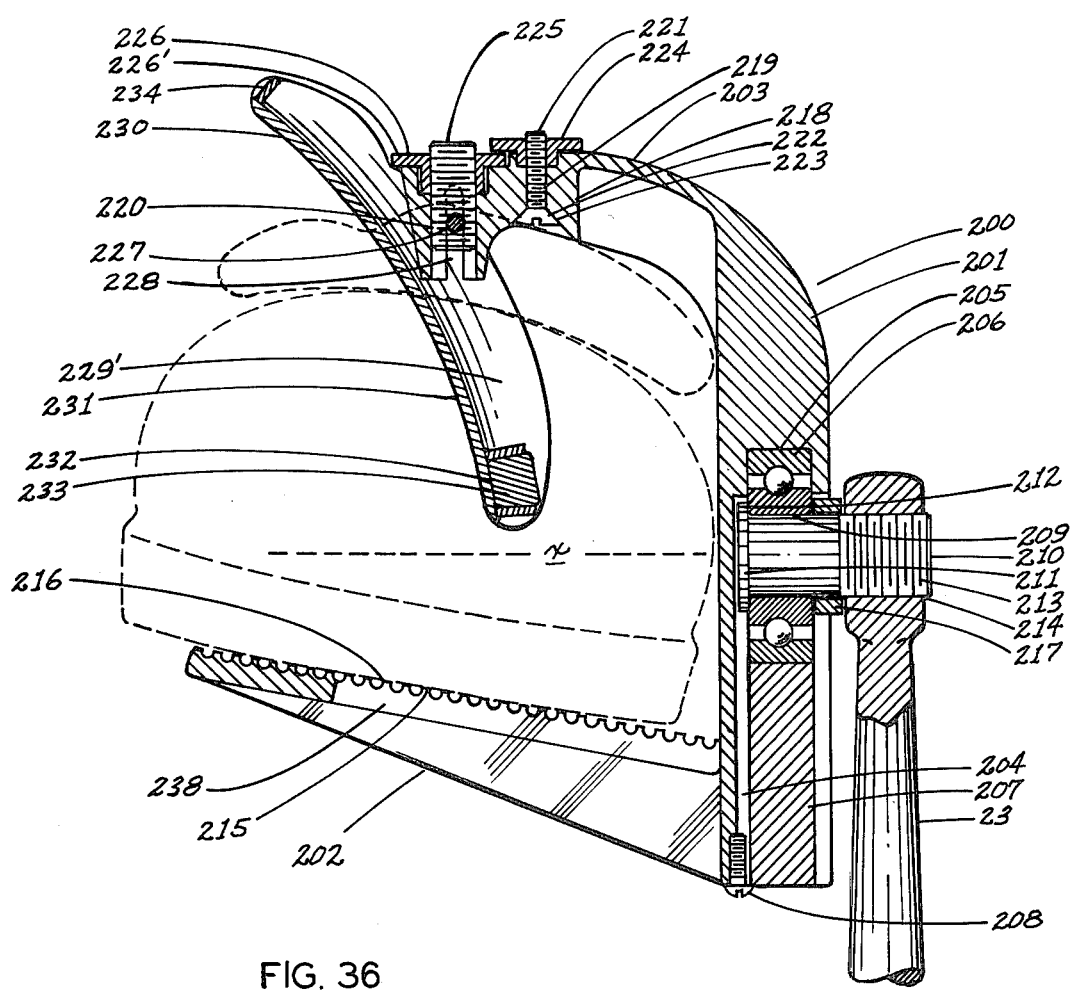
FIG. 36 is a vertical transverse sectional view taken on the line 36—36 of FIG. 32.
Figure 35:
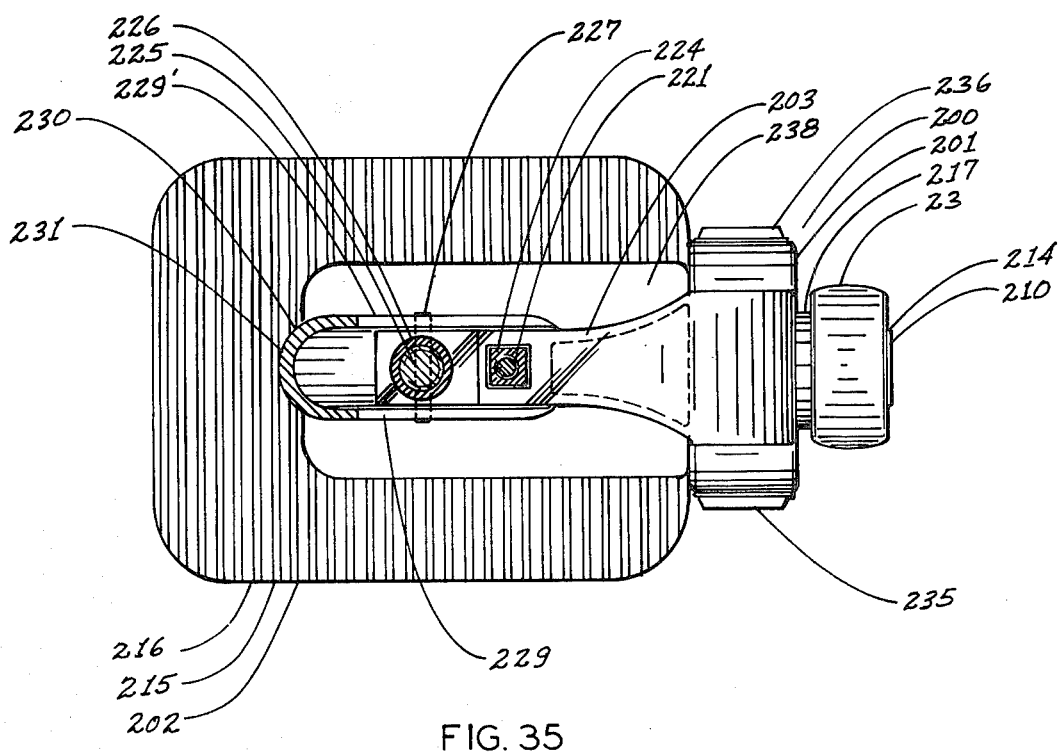
FIG. 35 is a transverse view, in partial section, taken on the line 35—35 of FIG. 31.

At its normally inner end member 230 may be provided with a socket 232 for receiving a weight 233 for biasing said member 230 into downwardly swung position as shown in full lines in FIG. 36 so that when the rider's foot is removed said member 230 will be prejudiced into open position. At its outer or upper end member 230 is provided with a rigidifying cross piece 234 and it will be seen that member 230 is generally U-shaped in cross-section and thus being relatively light, yet sturdy.

Provided on the front and back faces of post 201 are reflectors 235, 236, respectively, which may be secured in any suitable manner, such as by adhesives.

Pedal 200 is so constructed as to be fully balanced in operative position so that there is no bias toward swinging into upside down condition in disuse as is the unvarying tendency of current pedals. Weight 233 is so located with respect to the center of gravity of pedal 200 that such will not interfere with the balanced character of pedal 200.

Member 230 maintains the foot of the user firmly during bicycle operation but, as stated, permits of facile withdrawal of the foot, either rearwardly or outwardly laterally as desired, or necessary. Thus, pedal 200 obviates the incorporation of the standard toe clip, the primary function of which has been to retain the usual leather strap in open condition.

Figure 32:
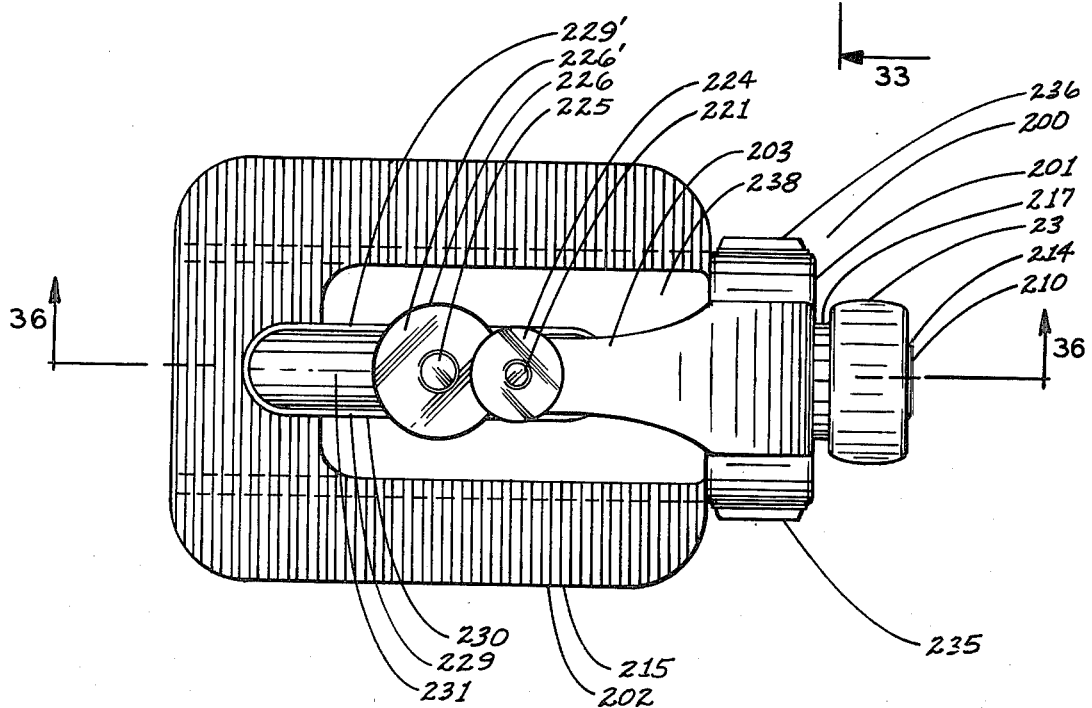
FIG. 32 is a top plan view taken on the line 32—32 of FIG. 31.
Figure 34:
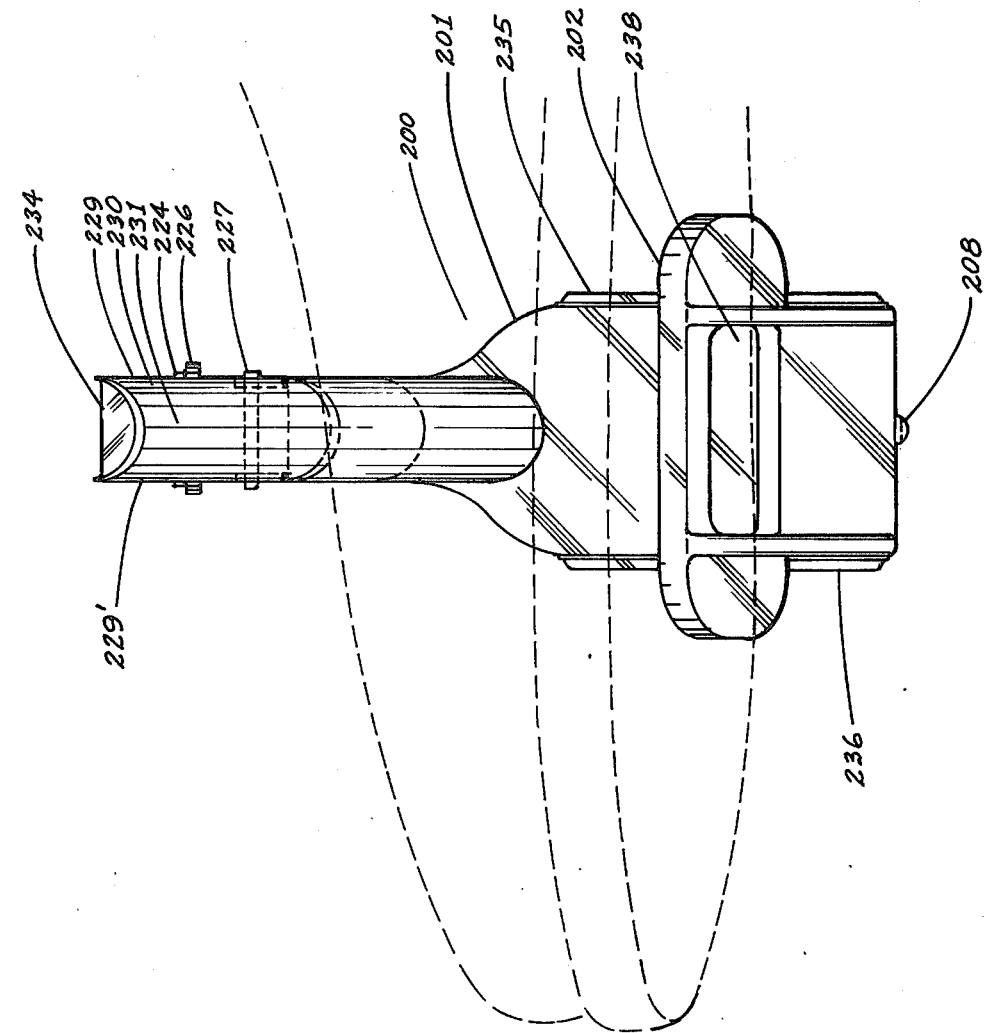
FIG. 34 is a side elevational view taken on the line 34—34 of FIG. 31.
Figure 33:
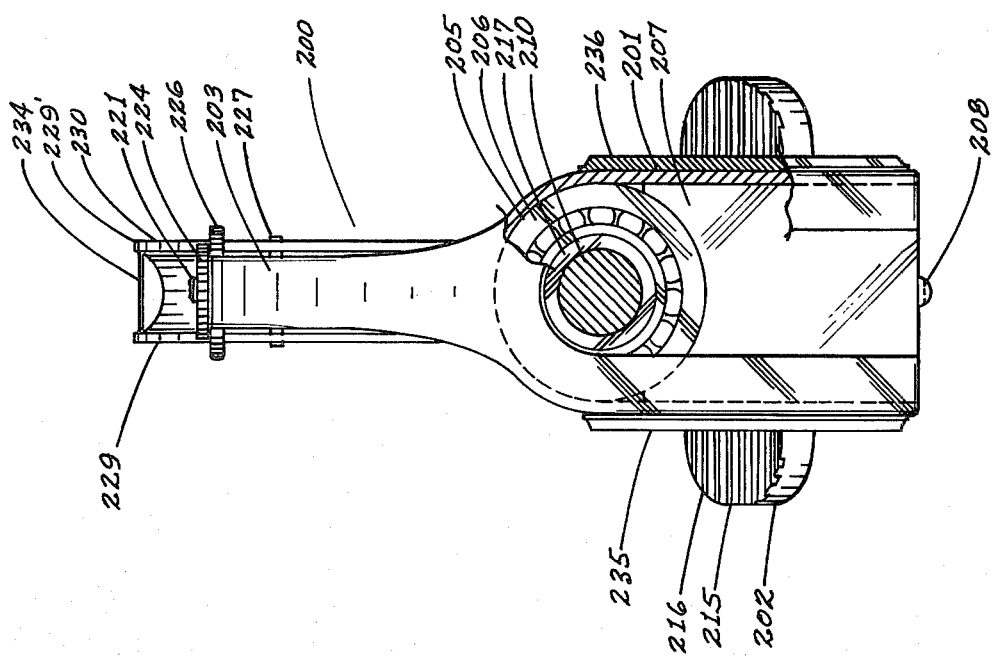
FIG. 33 is a vertical view in partial section taken on the line 33—33 of FIG. 31.

It may be noted that foot support 202 is provided with an enlarged opening 238, being of greater extent than the overlying bracket 230 and allows for the forming mold to be separated as on a parting line coincident with the reference line 36—36 of FIG. 32.

Figure 37:
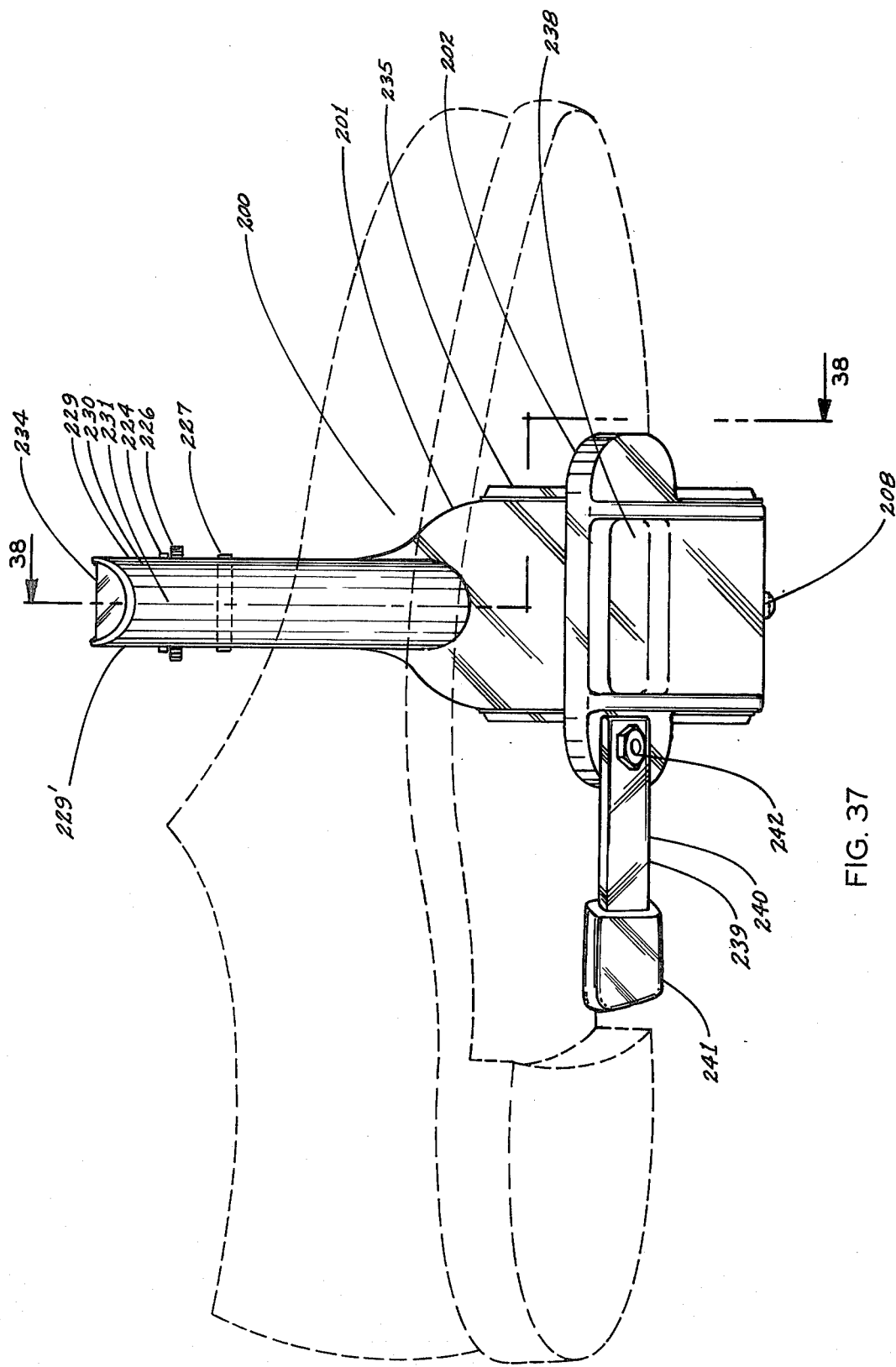
FIG. 37 is a side view of the foot pedal illustrated in FIG. 31, but illustrating a support stand, as viewed from the right hand side of the bicycle.
Figure 38:
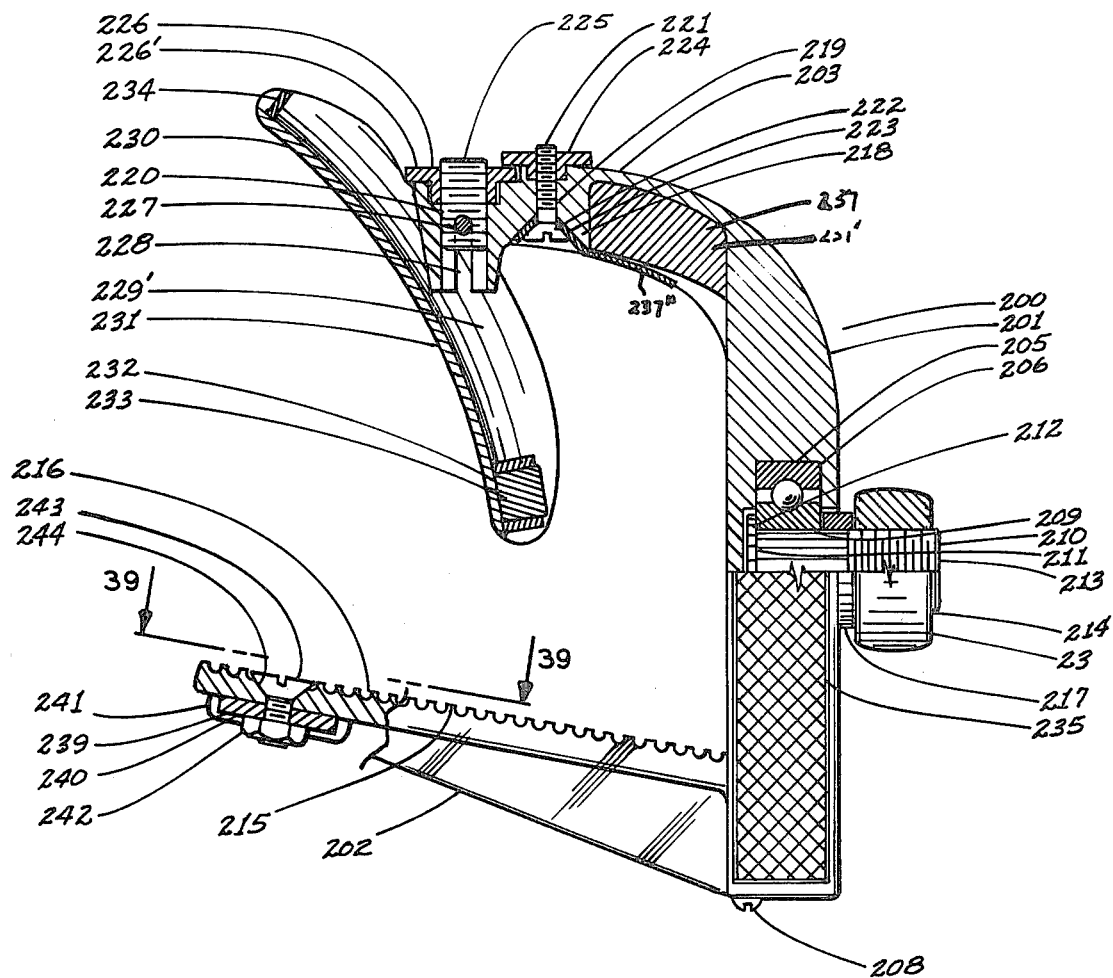
FIG. 38 is a vertical transverse sectional view taken on the line 38—38 of FIG. 37.
Figure 39:
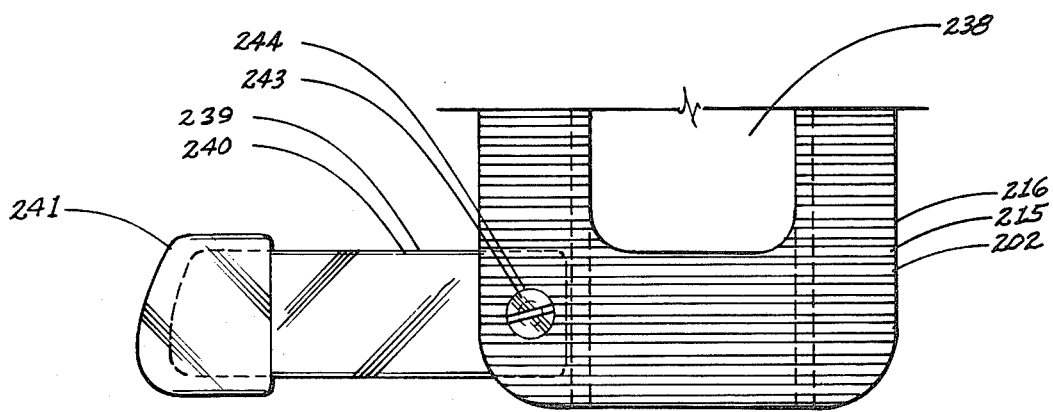
FIG. 39 is a fragmentary top plan view taken on the line 39—39 of FIG. 38.
Figure 40:
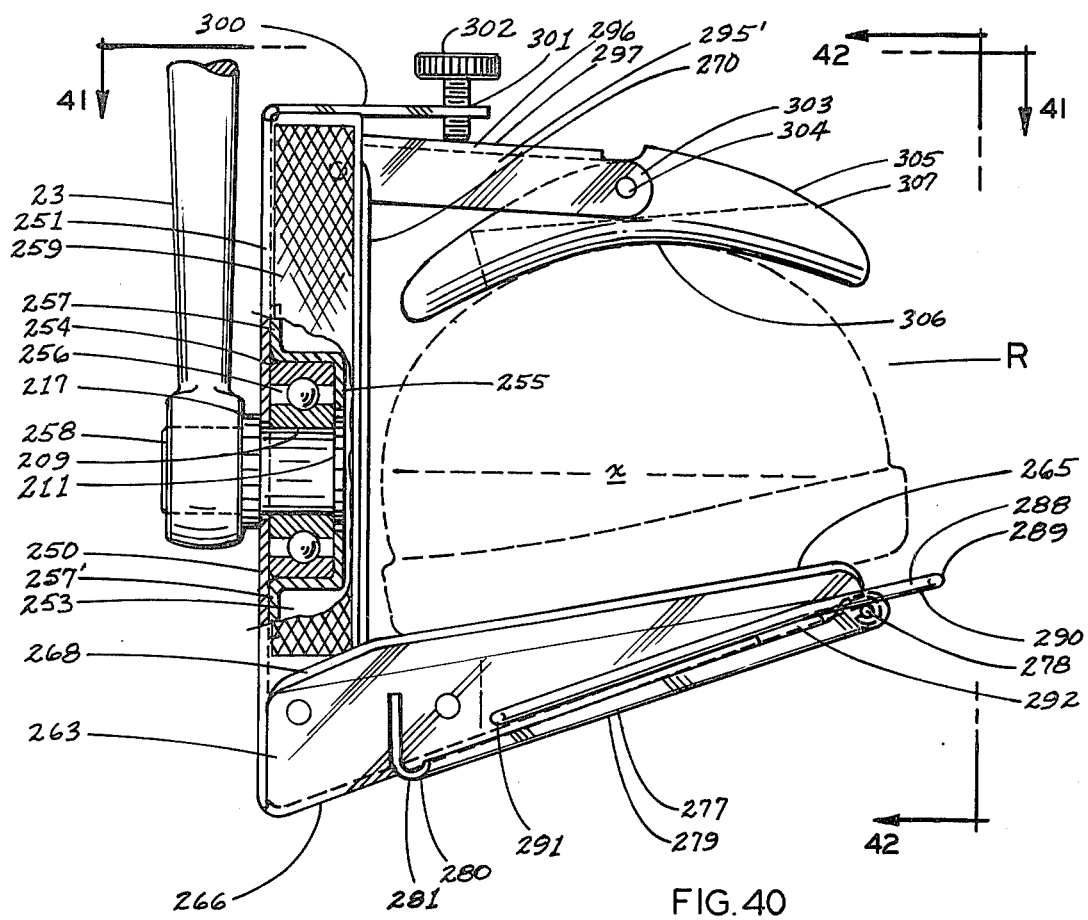
FIG. 40 is a rear elevational view, in partial section, of another form of foot pedal constructed in accordance with and embodying the present invention, showing the right hand pedal.
Figure 41:
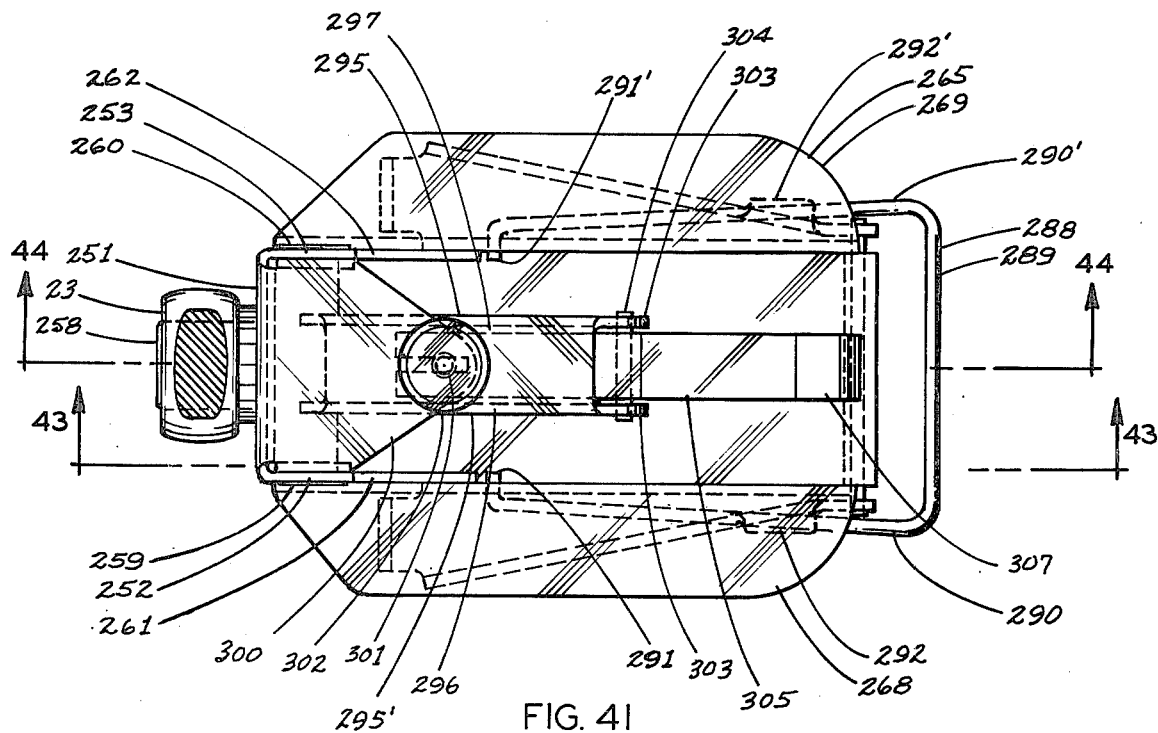
FIG. 41 is a top plan view taken on the line 41—41 of FIG. 40.

As shown in FIGS. 37, 38 and 39 pedal 200 may be provided, if desired, with a support stand 239 embodying a leg 240, as fabricated of stainless steel, and mounting a resilient friction-producing cap or foot 241 at its pedal remote end. The opposite end of leg 240 is secured to foot support 202 as by bolt 242, the head 243 of which is accepted within a countersink 244 provided in the said foot support 202. The aforesaid FIGURES which illustrate the right hand side pedal of bicycle A demonstrate that support stand 239 projects rearwardly from the outer rear portion of foot support 202 and from the under side thereof, so as to not interfere with the rider's foot. The axis of said support stand is perpendicular to the transverse axis of foot support 202. The weight of pedal 200 is properly balanced so that when the user's foot is removed the said pedal will rock to cause a portion of foot 241 of stand 239 to fall within a line passing through the center of ball bearing 206. In order to assure of this relationship weight 233 within socket 232 may be of appropriately predetermined character. As brought out above pedal 200 is of relatively light weight, being fabricated of molded glass filled nylon. In order to assure the desired balancing of foot pedal 200 so that the same will reamin in upright condition at all times, a seat 237 of suitable quantity may be disposed within a pocket 237' formed in bracket arm 203 in its inner portion, adjacent post 201. A retaining clip 237" supported from the head 222 of screw 221 may be utilized for retaining said weight 237 against inadvertent displacement.

Figure 47:
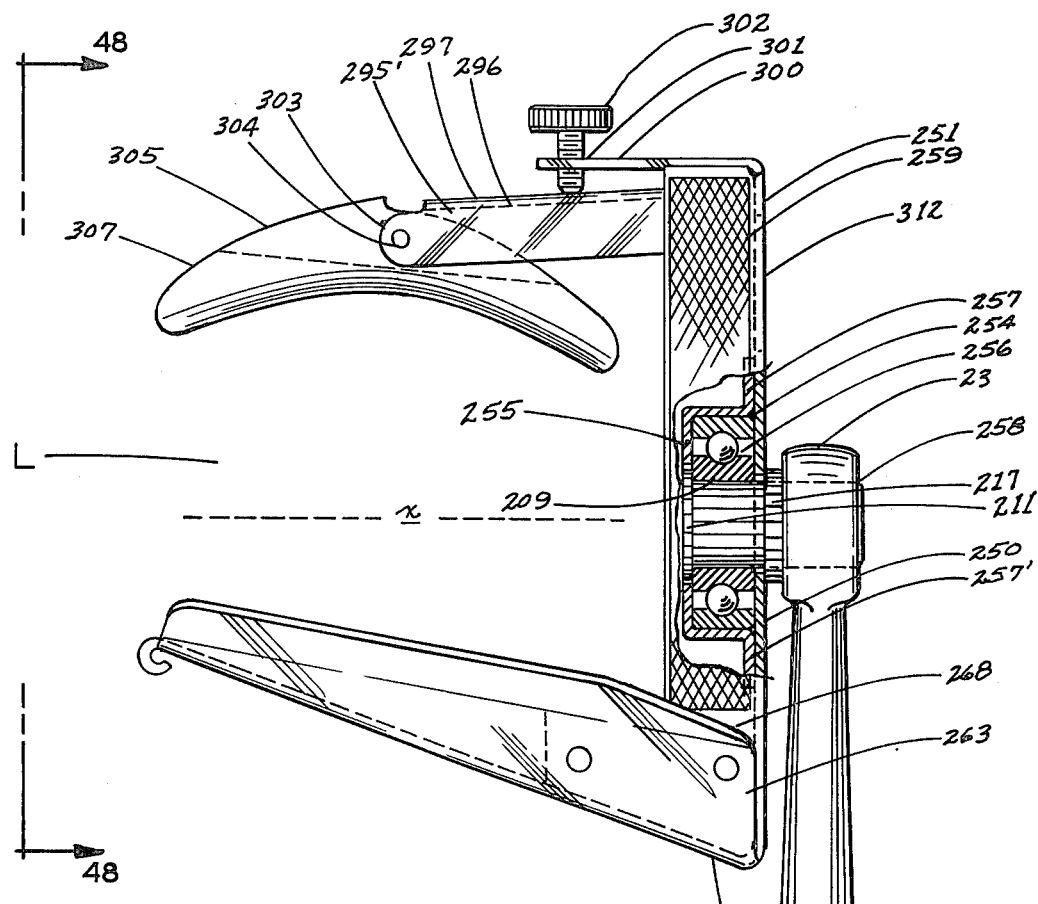
FIG. 47 is a rear view of an additional form of foot pedal constructed in accordance with and embodying the present invention being taken substantially on the line 5—5 of FIG. 2.
Figure 48:
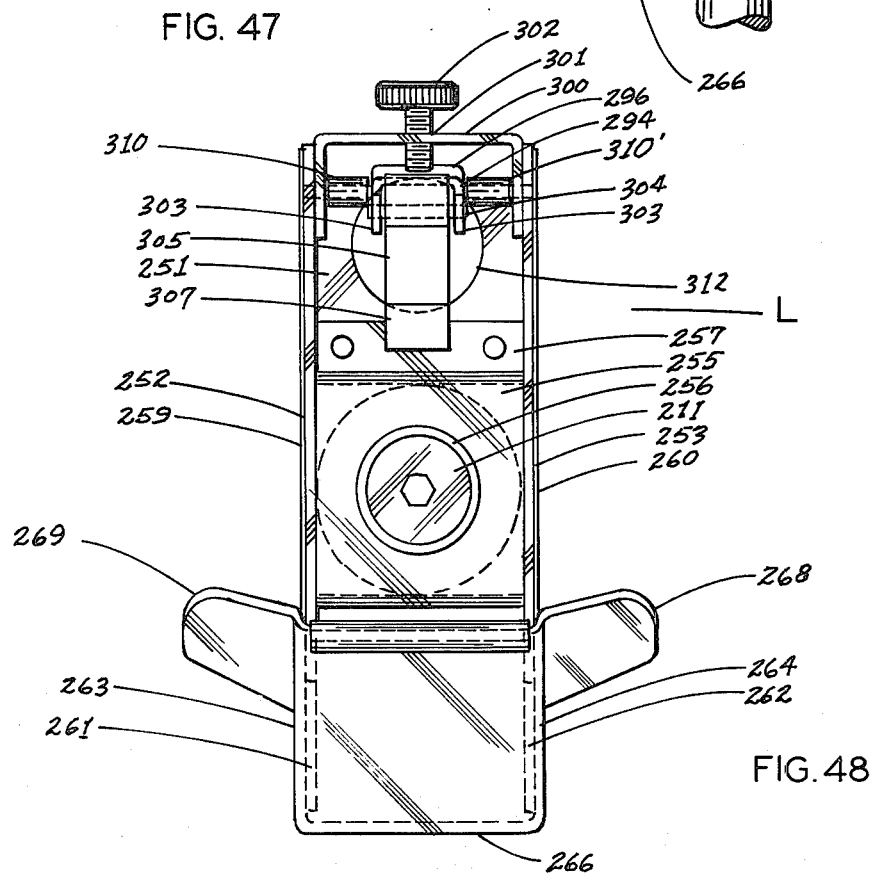
FIG. 48 is a side elevational view taken on the line 48—48 of FIG. 47.

Turning now to FIGS. 40-48, inclusive, R generally designates a still further form of pedal embodying the present invention and being of the underslung character described above. The pedal illustrated in FIGS. 40-46, inclusive, and that shown in FIGS. 47 and 48 are of identical construction so that like components will bear like reference numerals for purposes of brevity, with pedal R being described as to such common features. However, the pedal shown in FIGS. 40-46 incorporates a support stand which is absent from the pedal shown in FIGS. 47 and 48 although obviously either or both of these pedals may incorporate the support stand to be described, the same is shown as being mounted upon the right hand pedal R (FIGS. 40-46) and with the other or left hand pedal L being devoid thereof. Pedal R which may be most economically fabricated through the integration of stamped metal components comprises an upstanding post-forming portion 250 being of generally outwardly opening channel form having a web 251 and forward and rearward side flanges 252,253, there being an enlarged opening substantially centrally of said web 251, as at 254, for alignment with the interior of an inwardly opening receptacle 255 for a sealed ball bearing assembly 256, snugly retained therein; said receptacle having a marginal flange 257,257' for suitable securement to the confronting portion of web 250. Said bearing assembly 256 is suitably secured to the adjacent crank 23,23', as the case may be, as by the customary crank arm-forming screw 258. Suitably secured upon the outer faces of said side flanges 252,253 are reflectors 259,260, respectively.

At their lower ends flanges 252,253 are provided with relatively short outwardly projecting sections 261,262, respectively, for securement, as by rivets, to the inner portions of the side flanges 263,264 of a foot support component 265 which comprises a base web 266 extending between the lower margins of said flanges 263,264 and with there being an enlarged central opening 267 provided therein for purposes presently appearing. Presented at the upper ends of said side flanges 263,264 are forwardly and rearwardly turned relatively enlarged foot support flanges 268,269, respectively. It will be observed that foot support component 265 is of basically the same configuration as the foot support members described hereinabove in that the foot supporting flanges are located substantially below the pivot axis x of pedal R so as to endow said pedal with the same functional characteristics as the other underslung pedals of this invention.

Figure 43:
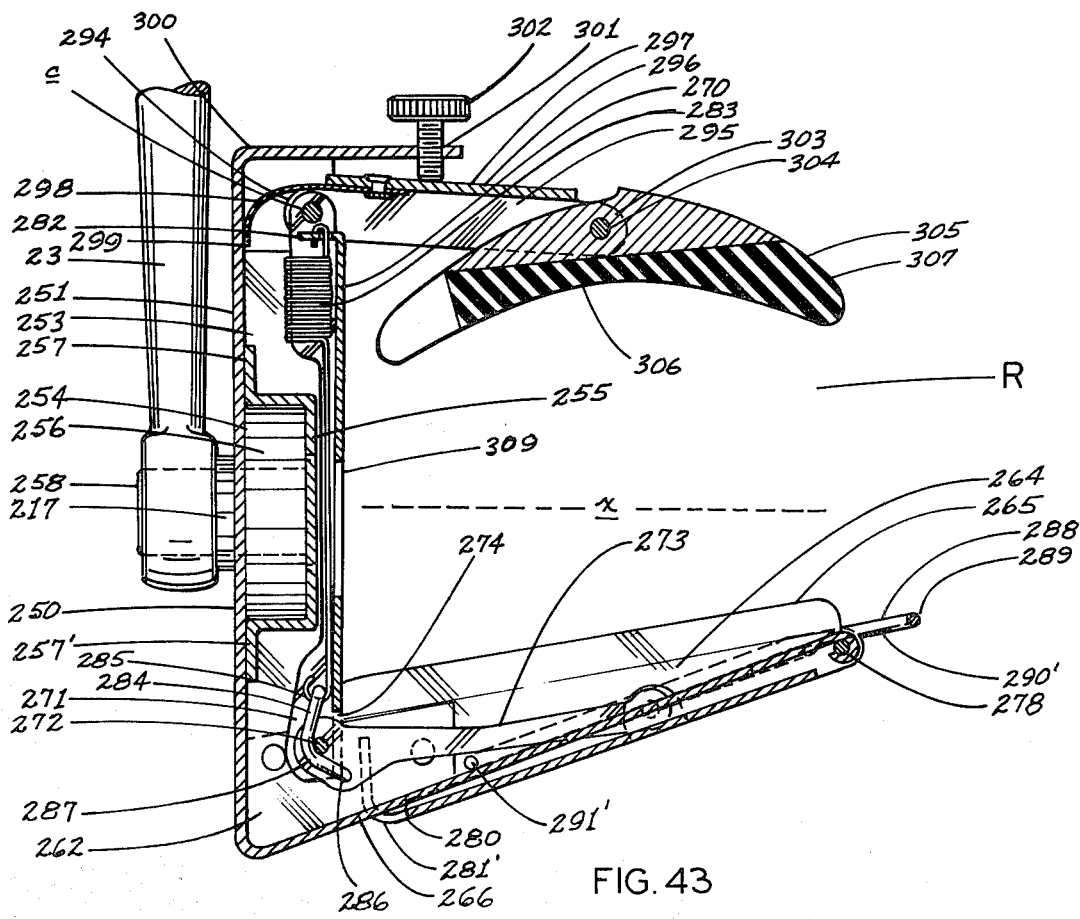
FIG. 43 is a vertical transverse sectional view taken on the line 43—43 of FIG. 41 illustrating the pedal in bicycle operational position.
Figure 44:
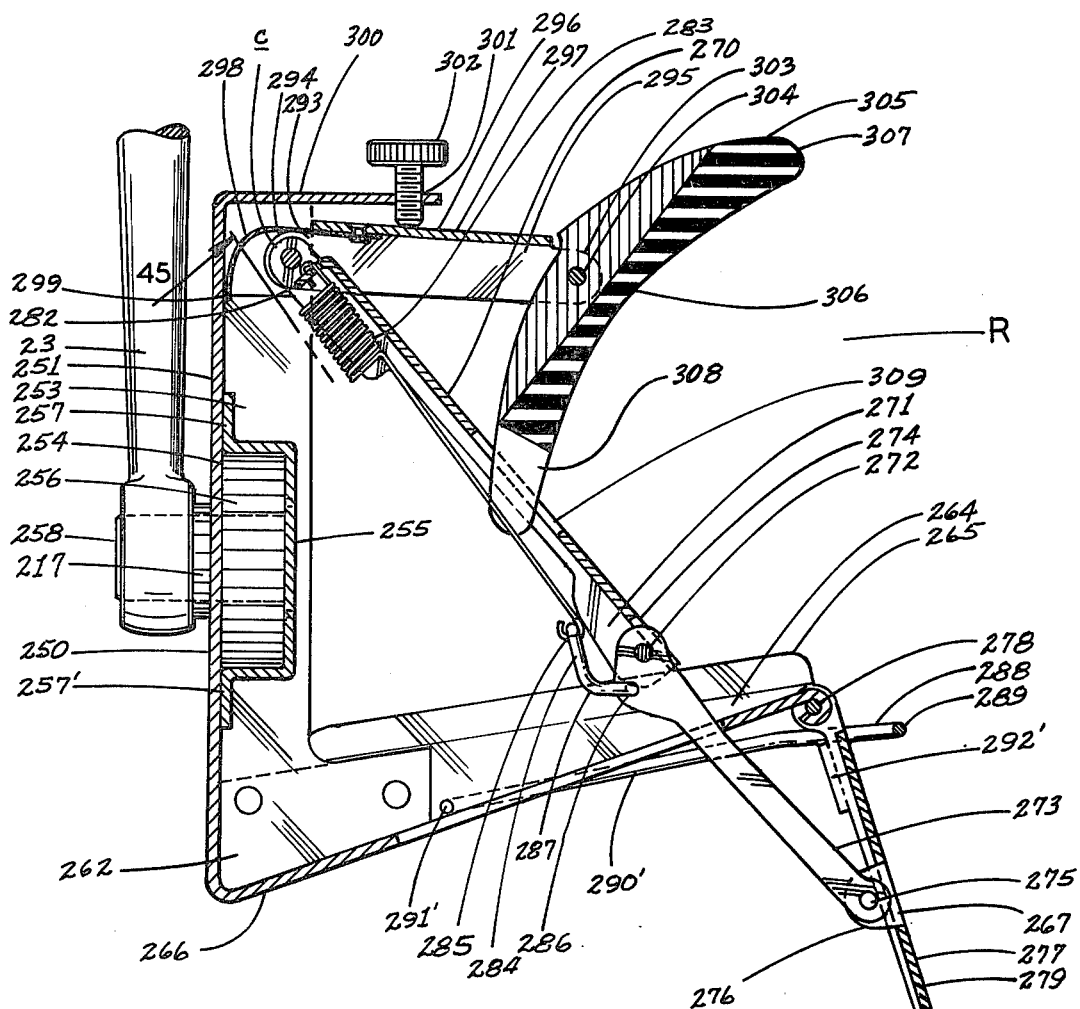
FIG. 44 is a vertical transverse sectional view taken on the line 44—44 of FIG. 41 but illustrating the support stand in bicycle supporting position.
Figure 46:
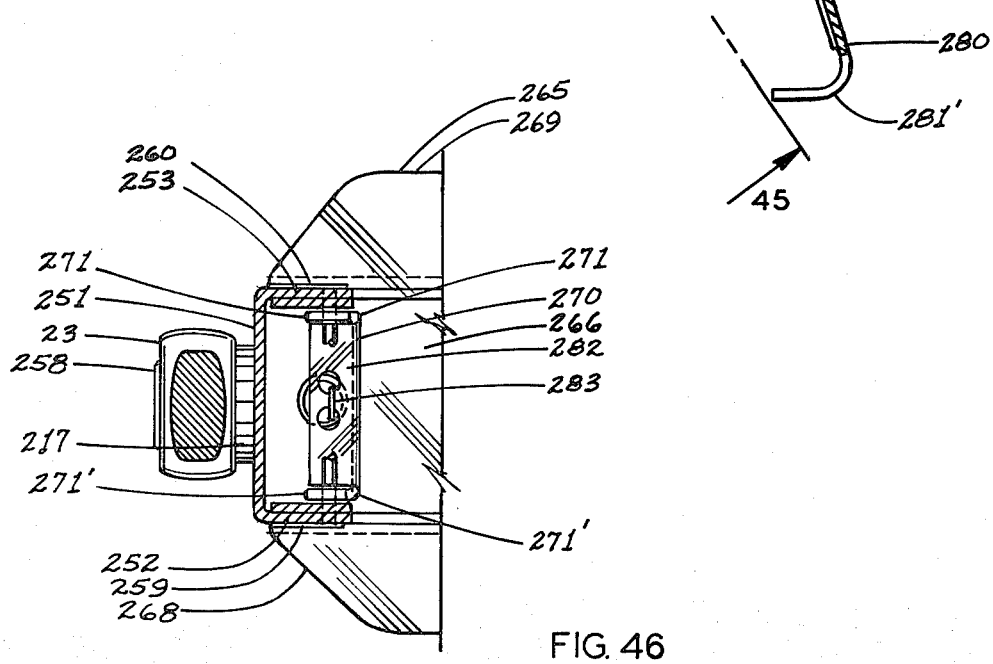
FIG. 46 is a horizontal transverse sectional view taken on the line 46—46 of FIG. 42.
Figure 45:
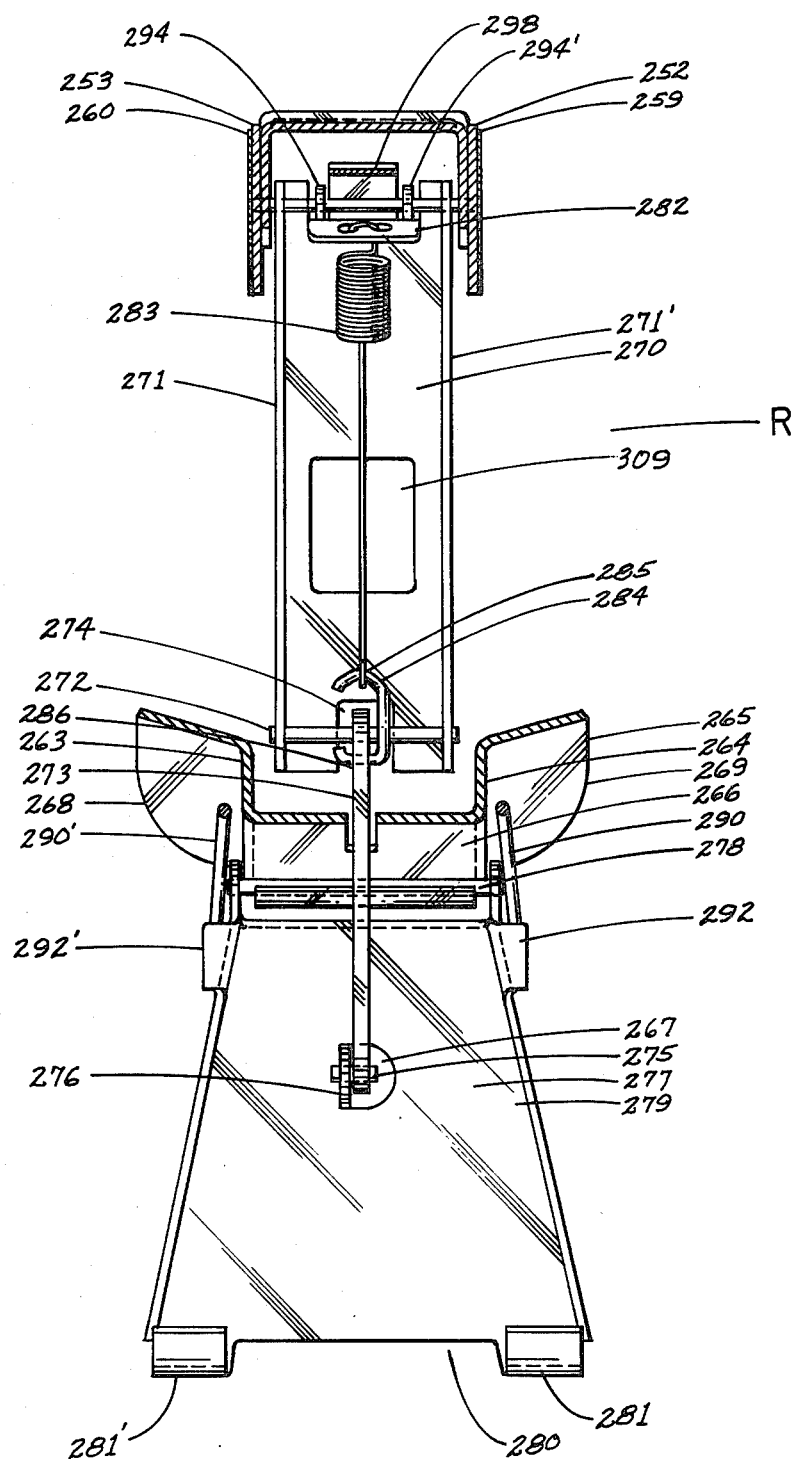
FIG. 45 is a view, in partial section, taken on the line 45—45 of FIG. 44.

Pivotally engaged to flanges 252,253 of post 250, at the upper ends of said flanges, is an upper toggle arm 270 fabricated also of sheet metal stock and being thus adapted to be moveable from inward or substantially vertical position (FIG. 43) wherein the same is in immediate adjacency to receptacle 255 and operative outward position as shown in FIG. 44, all of which will be described more fully hereinbelow. Toggle arm 270 is provided on its lower side margins with inwardly turned, substantially planar parallel side flanges 271,271' through which are fixed the ends of a pivot pin 272 extending transversely therebetween and being centrally engaged to the normally inner end of a cooperating toggle arm 273, the upper end of which is accommodated within a recess 274 formed in the lower central portion of toggle arm 270. Toggle arm 273 extends beneath foot support component 265 for pivotal engagement of its opposite or outer end, as by a pin 275, to a boss 276 extending from the inner face of a support stand 277 which is also formed of sheet stock. The upper end of stand 277 is hingedly engaged, as at 278, to the outer lateral portion of foot support 265. Said support stand 277 is constituted of a flat web 279 which at its upper pivoted end is of substantially like transverse extent as base web 266 of foot support 265 and therefrom tapers outwardly toward a relatively widened base portion, as at 280, at the opposite ends of which are provided inturned feet 281,281' for engaging the particular support surface. It will thus be observed that support stand 277 is of relatively increased width with respect to support stands hereinabove described so as to present at least a two-point spaced-apart contact with the particular support surface for assuring of stable disposition of bicycle A, whether the same be located upon the ground or upon an interior flooring which might be relatively slick, such as encountered in display or showrooms.

Toggle arm 270 in its upper central portion is turned rearwardly to provide a mounting ear 282 to which is engaged one end of a tension coil spring 283, the lower end of which latter is fixed to the upper end of a generally C-shaped connector 284, as at 285. Said connector in its lower portion is interengaged to toggle arm 273 adjacent, but downwardly of, pivot pin 272, as at 286. With reference to FIGS. 43 and 44, it will be seen that said connector 284 is also arcuated or outwardly concave within its vertical plane, as at 287, so that its central portion is disposed inwardly of said pivot pin 272.

Figure 42:
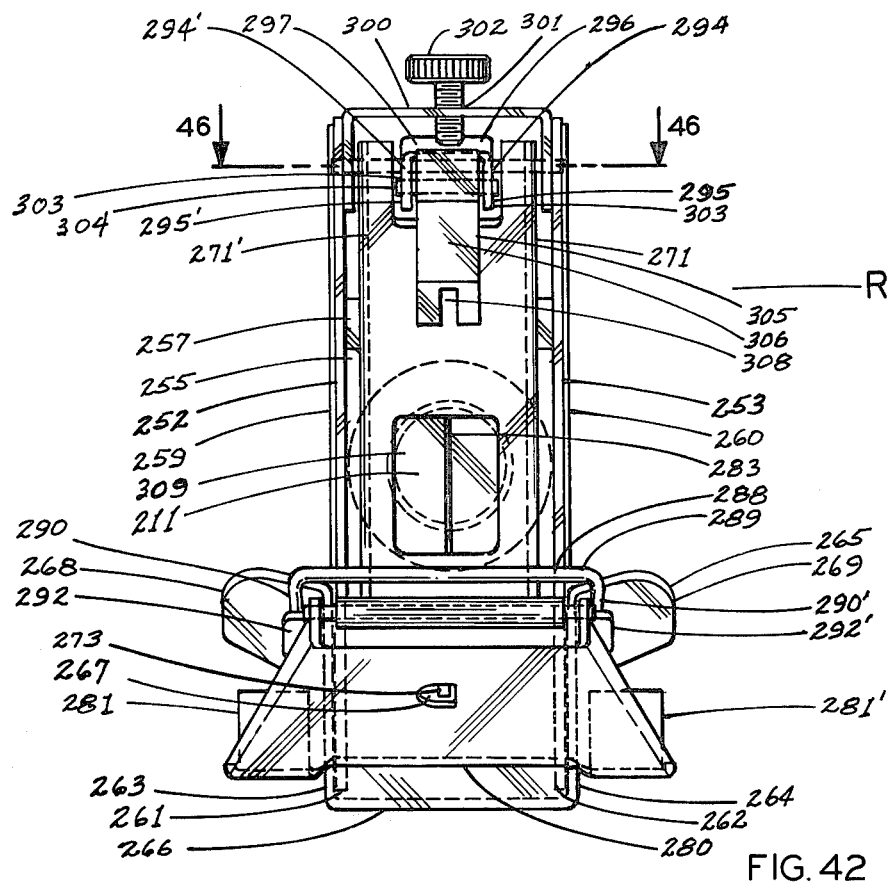
FIG. 42 is a side elevational view taken on the line 42—42 of FIG. 40.

A toggle-control member or trigger 288 is provided which may be formed of narrow diameter rod stock and is of general bail form having an outer transverse portion 289 and inwardly extending legs 290,290' (FIG. 42) and with the inner ends of said legs having perpendicular extensions 291,291' for reception within apertures formed in side flanges 263,264 of foot support member 265; said extensions 291,291' thus establishing a pivot axis about which said trigger 288 may be rocked. It will be observed that the outer transverse porton 289 of said trigger 288 is normally located immediately outwardly of the outer side of foot support member 265 (FIGS. 42,43). Legs 290,290' of trigger 288 will normally abut the inward surface of short flanges 292,292', respectively, projecting from the adjacent sides of support stand 277.

From the foregoing it will be seen that with pedal R in a condition for operation, support stand 277 will be disposed in upper, inoperative position lying substantially against the under face of foot support 265 with feet 281,281' received immediately inwardly of sections 261,262, respectively, of lower end flanges 252,253 of post 250. Lower toggle arm 273 will be nested beneath foot support member 265 and, as stated, trigger transverse portion 289 is located just outwardly of foot support 265; and upper toggle arm 270 is in substantially vertical position through normal bias of spring 283. It is to be particularly noted that toggle arms 270,273 are urged into this position by reason of spring 283 pulling to the right hand side of the axis of pivot pin 272 as viewed in FIG. 43.

When the rider wishes to place the stand into operative position, he merely permits his foot in withdrawing from foot support member 265 to engage the projecting portion of trigger 288 and with slight downward pressure thereon causes the latter to rock downwardly thereby operating against stand 277 by the force applied upon short flanges 292,292' causing stand 277 to swing downwardly about the hinge axis at 278, pulling lower toggle arm 273 downwardly and outwardly and which latter causes upper toggle arm 270 to be swung outwardly about the pivot axis at its upper end, as at c. Spring 283 thus exerts a pulling force upon toggle 273 which is located at the left hand side of the axis of pivot 272 as viewed in FIG. 44 and thus causes the toggle joint developed by said arms 270,273 to be in extended condition with toggle arm 273 abutting against a stop 293 developed by the forward edge of central opening 267. With spring 283 thus constituting an over-center spring, toggle arms 270,273 are rigidified for assuring stable positioning of stand 277. It will be seen that as stand 277 is pivoted into operative position, flanges 292, 292' move relative with respect to the legs 290,290', respectively, of trigger 288 until the same are brought into a condition of rest upon the upper edges of said flanges as may best be seen in FIG. 44.

In order to retract stand 277 the operator need merely direct the inner side of his foot against toggle arm 270 as the operator's foot is being placed upon the pedal and cause the toggle joint to swing with spring 283 passing over center and thus snapping the arms 270,273 into collapsed condition, as shown in FIG. 43.

Also engaged upon pivot axis or pin c are the transversely aligned bosses 294,294' provided at the inner ends of the side flanges 295,295' of a downwardly opening channel-shaped mounting arm 296, having an upper web 297. Fixed at one end to the inner under portion of web 297 is a spring clip 298, the opposite end of which bears against the outer face of post 250, as at 299, for normally urging said arm 296 into upwardly swung position. It will thus be seen that web 297 is located downwardly of an overhanging bracket 300 rigid with post 250 at its upper end and being provided with a tapped opening 301 proximate its outer end for accommodating a set screw 302, the lower end of which engages the confronting upper surface portion of web 297. Thus, said screw 302 serves to maintain arm 296 in selected disposition, countering the bias of spring clip 298.

At the outer ends of said bracket flanges 295,295' there are provided bosses, as at 303, for receiving a pin 304 extending transversely therebetween for rockably supporting a foot retaining bar 305 of substantially like general configuration as members 178 and 229 above discussed, having thus a generally downwardly concave foot-confronting portion, as at 306. Said bar 305 is provided with a downwardly opening socket throughout substantially its length for receiving a mass of cushioning mateial, as of rubber or the like and indicated generally 307, for reliable snug engagement with the upper portion of the rider's foot. Said bar 305 is normally biased into open position as shown in FIG. 44 so that upon inward movement of the rider's foot the same is rocked into foot-engaging condition. It will be observed that at the normally lower or inner end of said bar 305, adjacent the cushion 307, there is provided a groove 308 which is adapted to straddle the intervening length of spring 283 when said bar is in inoperative position (FIG. 44) and with such lower or inner end extending through a relatively enlarged opening 309 formed in toggle arm 270 so that when said bar 305 is in inoperative condition it may uninhibitedly project therethrough.

Spacer elements 310,310' are disposed upon pivot pin c between the outer surfaces of mounting arm bosses 294,294' and the depending sides 311,311', respectively, of overhanging bracket 300 to assure of proper disposition of mounting arm 296 at all times.

Turning more specifically to FIGS. 47 and 48 pedal L will be seen to be of substantially identical construction as pedal R with the exception of the support stand 277 and the operative elements associated therewith. Since the desired lower center of gravity may be more readily provided with pedal R by reason of the incorporation of support stand 227 and the related elements, there is no serious problem for balancing same in order that it may remain in upright condition at all times. In order to assure that pedal L is likewise so balanced for assuming a constant upright attitude, post 250 is reduced in weight as by the provision of an enlarged opening indicated at 312 and with foot support flanges 268,269 being slightly relatively increased for providing additional weight below the x axis.

Having described my invention what I claim and desire to obtain by Letters Patent is:

1. A bicycle comprising a frame having front and rear axle mounted wheels, a hub supported by said frame, a pedal crank assembly comprising a main shaft journalled in said hub, a pedal crank in axially normal relationship to said main shaft mounted on each end thereof, a shaft-forming element secured to each pedal crank in the end portion thereof remote from said main shaft and extending laterally from the related crank, the longitudinal axis of said shaft-forming member constituting a pivot axis, pedal means provided upon each shaft-forming element for rotation about said pivot axis, each pedal means comprising an annular support plate having a peripheral, inwardly turned flange providing an outer circumferential surface, each of said plates further having a central outwardly opening recess having a side wall concentric with said flange and a base wall, with an opening therein, a bearing assembly fitted within said recess, said shaft-forming element projecting through said recess base opening and operatively engaged to said bearing assembly, a foot supporting member carried by each pedal means having a foot-receiving surface located downwardly of said pivot axis when in operative position.

2. A bicycle as defined in claim 1 and further characterized by said bearing means being ball bearings.

3. A bicycle as defined in claim 2 and further characterized by means engaging said foot supporting member on said pedal means circumferential surface radially outwardly of said bearing means.

4. A bicycle as defined in claim 3 and further characterized by a bicycle ground-engageable support stand rigidly and non-foldably affixed to at least one of said foot support member in the outer portion thereof for extension rearwardly of said foot receiving surface when the bicycle is in running condition.

5. A bicycle as defined in claim 1 and further characterized by a bracket carried on each pedal support plate in upwardly spaced relationship to said foot receiving surface and above said pivot axis, and an upper foot engaging arm swingably supported from bracket.

6. A bicycle as defined in claim 5 and further characterized by said pedal mounting means being of post character, said bracket being swingably engaged at its inner end upon said post, means for controlling the swinging of said bracket for locating said arm in desired spatial relationship to said foot-receiving surface.

7. A bicycle as defined in claim 6 and further characterized by said swing controlling means comprising a resilient member secured to said bracket urging same into upwardly swung position, and an adjustable stop member engaging said bracket for selectively limiting the degree of swing thereof.

8. A bicycle as defined in claim 5 and further characterized by said upper foot engaging arm having a normally downward concave portion.

9. A bicycle as defined in claim 8 and further characterized by friction producing means provided on the downwardly directed portion of said foot engaging arm for reliable contact with the user's foot.

10. A bicycle as defined in claim 5 and further characterized by said bracket projecting laterally outwardly of said bicycle, a pivot carried on said bracket in the portion thereof overlying substantially the control portion of foot receiving surface, said upper foot engaging arm swingably carried on said pivot for rocking between full downwardly directed, operative position, and upwardly and outwardly directed, inoperative position.

11. A bicycle as defined in claim 10 and further characterized by said bracket outer extremity terminating spacedly inwardly of the outer extremity of said foot receiving surface, said outer end extremity of said bracket constituting an abutment for limiting upward and outward swinging of said arm.

12. A bicycle as defined in claim 11 and further characterized by said arm being downwardly concave and means biasing said arm into inoperative position.

13. A bicycle as defined in claim 1 and further characterized by a ground-engageable support stand pivotally mounted in the normal upper portion thereof to the lateral outer side portion of the related foot supporting means for swingable movement being downwardly and outwardly swung operative condition, and inwardly and upwardly swung, inoperative condition beneath said foot supporting means, and toggle means for controlling the swinging of said stand between operative and inoperative position.

14. A bicycle as defined in claim 13 and further characterized by said toggle means comprising first and second mutually hingedly engaged toggle arms, said first toggle arm being engaged to said stand, said second toggle arm being operatively engaged to pedal mounting means, and resilient means interconnecting said toggle means with said pedal mounting means.

15. A bicycle as defined in claim 14 and further characterized by said resilient means being an elongated over-center spring having one end operatively engaged to said pedal mounting means and the other end engaged to said toggle arms in the zone of the hinge therebetween.

16. A bicycle as defined in claim 15 and further characterized by a foot operated stand control lever rockably mounted on the pedal supporting means and engaging said stand.

17. For use with a bicycle having a main pedal shaft journalled in a hub, the improvement comprising a pedal crank assembly comprising a pedal crank mounted on each end of said main shaft in axial normal relationship thereto, a shaft-forming element secured to each pedal crank in the end portion thereof remote from said main shaft and extending laterally from the related crank, the longitudinal axis of said shaft-forming member constituting a pivot axis, pedal means provided upon each shaft-forming element for rotation about said pivot axis, each pedal means comprising an annular support plate having a peripheral, inwardly turned flange providing an outer circumferential surface, each of said plates further having a central outwardly opening recess having a side wall concentric with said flange and a base wall, with an opening therein, a bearing assembly fitted within said recess, said shaft-forming element projecting through said recess base opening and operatively engaged to said bearing assembly, a foot supporting member carried by each pedal means having a foot-receiving surface located downwardly of said pivot axis when in operative position.

18. The improvement as defined in claim 17 and further characterized by said bearing means being ball bearings.

19. The improvement as defined in claim 17 and further characterized by means engaging said foot supporting member on said pedal means circumferential surface radially outwardly of said bearing means.

20. The improvement as defined in claim 18 and further characterized by a bicycle ground-engageable support stand rigidly and non-foldably affixed to at least one of said foot support members in the outer portion thereof for extension rearwardly of said foot-receiving surface when the bicycle is in running condition.

21. The improvement as defined in claim 17 and further characterized by said pedal mounting means being of post character, a bracket being swingably engaged at its inner end upon said post, an upper foot engaging arm, means for controlling the swinging of said bracket for locating said upper foot engaging arm in desired spatial relationship to said foot-receiving surface.

22. The improvement as defined in claim 21 and further characterized by said swing controlling means comprising a resilient member secured to said bracket urging same into upwardly swung position, and an adjustable stop member engaging said bracket for selectedly limiting the degree of swinging thereof.

23. The improvement as defined in claim 22 and further characterized by friction producing means provided on the downwardly directed portion of said foot engaging arm for reliable contact with the user's foot.

24. The improvement as defined in claim 23 and further characterized by a ground-engageable support stand pivotally mounted in the normal upper portion thereof to the lateral outer side portion of the related foot supporting means for swingable movement being downwardly and outwardly swung operative condition, and inwardly and upwardly swung, inoperative condition beneath said foot supporting means, and toggle means for effecting the swinging of said stand between operative and inoperative position.

25. The improvement as defined in claim 24 and further characterized by said toggle means comprising first and second mutually hingedly engaged toggle arms, said first toggle arm being engaged to said stand, said second toggle arm being operatively engaged to pedal mounting means, and resilient means interconnecting said toggle arms with said pedal mounting means.

26. The improvement as defined in claim 25 and further characterized by said resilient means being an elongated over-center spring having one end operatively engaged to said pedal mounting means and the end engaged to said toggle arms in the zone of the hinge therebetween.

27. The improvement as defined in claim 26 and further characterized by a foot operated stand central lever rockably mounted on the pedal supporting means and engaging said stand.

28. For use with a bicycle having a main pedal shaft journalled in a hub, the improvement comprising a pedal crank assembly comprising a pedal crank mounted on each end of said main shaft in axial normal relationship thereto, a shaft-forming element secured to each pedal crank in the end portion thereof remote from said main shaft and extending laterally from the related crank, the longitudinal axis of said shaft-forming member constituting a pivot axis, pedal means provided upon each shaft-forming element for rotation about said pivot axis, foot supporting means carried by each pedal means having a foot-receiving surface located downwardly of said pivot axis when in operative position, and a bracket carried on said pedal means in upwardly spaced relationship to said foot receiving surface and above said pivot axis, and an upper foot engaging arm swingably supported from said bracket.

29. The improvement as defined in claim 28 and further characterized by said bracket projecting laterally outwardly of said bicycle, a pivot carried on said bracket in the portion thereof overlying substantially the control portion of foot receiving surface, said upper foot engaging arm swingably carried on said pivot for rocking between full downwardly directed, operative position, and upwardly and outwardly directed, inoperative position.

30. The improvement as defined in claim 29 and further characterized by said bracket outer extremity terminating spacedly inwardly of the outer extremity of said foot receiving surface, said outer end extremity of said bracket constituting an abutment for limiting upward and outward swinging of said arm.

31. The improvement as defined in claim 30 and further characterized by said arm being downwardly concave and means biasing said arm into inoperative position.

32. A bicycle comprising a frame having front and rear axle mounted wheels, a hub supported by said frame, a pedal crank assembly comprising a main shaft journalled in said hub, a pedal crank in axially normal relationship to said main shaft mounted on each end thereof, a shaft-forming element secured to each pedal crank in the end portion thereof remote from said main shaft and extending laterally from the related crank, the longitudinal axis of said shaft-forming element consituting a pivot axis, pedal mounting means disposed upon each shaft-forming element for rotation about said pivot axis, foot supporting means carried by each pedal mounting means having a foot-receiving surface located downwardly of said pivot axis when in an operative position, bearing means incorporated in said pedal mounting means and engaging said shaft-forming element to render said pedal mounting means rotatable thereabout, said pedal mounting means being of post character incorporating an extension projecting laterally outwardly at the upper end thereof in overlying relation to said foot-receiving surface, and an upper foot engaging element pivotally carrying said extension for swingable movement between a downwardly directed, operative position and an upwardly and outwardly swinging, inoperative position.

33. A bicycle as defined in claim 33 and further characterized by means provided on said extension for elevating and lowering said upper foot engaging element.

34. A bicycle as defined in claim 33 and further characterized by means biasing said foot engaging element into inoperative position.

35. A bicycle as defined in claim 34 and further characterized by said biasing means being a weight mounted on said element in its normally inner end portion.

36. A bicycle as defined in claim 32 and further characterized by said foot supporting means together with said foot receiving surface being integrally formed with said post thereby forming an integral pedal.

37. A bicycle as defined in claim 36 and further characterized by said pedal being weighted in order to remain in the same position whether the bicycle is in use or disuse with said foot-receiving surface being presented in upwardly directed condition.

38. A bicycle as defined in claim 36 and further characterized by a ground-engageable support stand rigidly and non-foldably secured to said pedal for extension rearwardly from the outer portion beneath said foot-receiving surface.

* * * * *

UNITED STATES PATENT OFFICE
CERTIFICATE OF CORRECTION

Patent No. 4,171,824          Dated October 23, 1979

Inventor(s) Edwin E. Foster

It is certified that error appears in the above-identified patent and that said Letters Patent are hereby corrected as shown below:

Column 27, claim 33, line 1, "33" should be ---32---.

Signed and Sealed this

Twelfth Day of February 1980

[SEAL]

Attest:

SIDNEY A. DIAMOND

Attesting Officer

Commissioner of Patents and Trademarks